(12) United States Patent
Renken et al.

(10) Patent No.: US 10,057,695 B2
(45) Date of Patent: Aug. 21, 2018

(54) HEARING AID BATTERY DOOR MODULE

(71) Applicant: ZPower, LLC, Camarillo, CA (US)

(72) Inventors: Troy W. Renken, Alpharetta, GA (US); Don Barrett, Camarillo, CA (US); Timothy W. Powers, Thousand Oaks, CA (US)

(73) Assignee: ZPower, LLC, Camarillo, CA (US)

( * ) Notice: Subject to any disclaimer, the term of this patent is extended or adjusted under 35 U.S.C. 154(b) by 0 days.

(21) Appl. No.: 15/317,998

(22) PCT Filed: Jun. 17, 2015

(86) PCT No.: PCT/US2015/036128
§ 371 (c)(1),
(2) Date: Dec. 12, 2016

(87) PCT Pub. No.: WO2015/195735
PCT Pub. Date: Dec. 23, 2015

(65) Prior Publication Data
US 2017/0134869 A1    May 11, 2017

Related U.S. Application Data

(60) Provisional application No. 62/048,465, filed on Sep. 10, 2014, provisional application No. 62/013,606, filed on Jun. 18, 2014.

(51) Int. Cl.
*H04R 25/00* (2006.01)
(52) U.S. Cl.
CPC ..... *H04R 25/602* (2013.01); *H04R 2225/021* (2013.01); *H04R 2225/31* (2013.01); *H04R 2225/33* (2013.01)
(58) Field of Classification Search
CPC .............. H04R 25/602; H04R 2225/31; H04R 2225/33; H01M 2/1044
(Continued)

(56) References Cited

U.S. PATENT DOCUMENTS

D354,568 S      1/1995  Araki et al.
6,144,749 A *  11/2000  Fideler ................. H04R 25/602
                                                      381/312
(Continued)

FOREIGN PATENT DOCUMENTS

EP       2645745       10/2013
WO    2014/008317       1/2014
WO    2015/195731      12/2015

OTHER PUBLICATIONS

International Preliminary Report on Patentability for PCT/US2015/036119 dated Dec. 29, 2016.
(Continued)

*Primary Examiner* — Matthew Eason
*Assistant Examiner* — Ryan Robinson
(74) *Attorney, Agent, or Firm* — Honigman Miller Schwartz and Cohn LLP; Andrew N. Weber; Jonathan P. O'Brien

(57) ABSTRACT

A hearing aid device (100, 100*a-b*) comprises a shell portion (104) and a battery door module (200, 200*a-b*) attached to the shell portion. The battery door module comprises a battery casing (221, 221*a-b*) and an electronics casing (208, 208*a-b*). The battery casing receives a battery (202) defining a battery axis ($L_{BAT}$) that extends substantially perpendicular to a longitudinal axis (L) of the battery door module. The electronics casing encloses a voltage regulator (216), a printed circuit board assembly (214), and at least a portion of one or more charging elements (220, 220*a*). The battery door module also comprises at least one attachment member (204, 206, 206*a-b*) that allows the battery door module to attach to a shell portion of the hearing aid device. The battery door module is movable relative to the shell portion between an open position and a closed position.

31 Claims, 20 Drawing Sheets

(58) Field of Classification Search
USPC .......................................................... 381/323
See application file for complete search history.

(56) References Cited

U.S. PATENT DOCUMENTS

| | | | |
|---|---|---|---|
| 6,304,467 B1 | 10/2001 | Nebrigic | |
| D457,635 S | 5/2002 | Dittli | |
| 6,473,511 B1 * | 10/2002 | Aceti | A61B 5/6817 |
| | | | 381/322 |
| 6,546,110 B1 * | 4/2003 | Vonlanthen | H04R 25/556 |
| | | | 381/314 |
| 6,658,125 B1 | 12/2003 | Batting | |
| 6,741,715 B2 * | 5/2004 | Andersen | H04R 25/505 |
| | | | 381/312 |
| 6,831,988 B2 | 12/2004 | Vonlanthen | |
| 7,068,804 B2 | 6/2006 | Batting | |
| 7,076,075 B2 | 7/2006 | Jorgensen | |
| D579,567 S | 10/2008 | Pedersen | |
| D599,908 S | 9/2009 | Nielsen | |
| 7,646,878 B2 | 1/2010 | Vonlanthen et al. | |
| D622,855 S | 8/2010 | Cano, Jr. | |
| D635,263 S | 3/2011 | Meinertz | |
| 8,027,497 B2 | 9/2011 | Klemenz et al. | |
| D646,788 S | 10/2011 | Dubs et al. | |
| 8,073,173 B2 | 12/2011 | Onodera | |
| 8,098,862 B2 * | 1/2012 | Koch | H04R 25/00 |
| | | | 381/313 |
| D663,847 S | 7/2012 | Dubs et al. | |
| D676,559 S | 2/2013 | Meinertz | |
| D676,967 S | 2/2013 | Meinertz | |
| D676,969 S | 2/2013 | Meinertz | |
| D682,429 S | 5/2013 | Campbell et al. | |
| D698,024 S | 1/2014 | Meinertz | |
| D701,604 S | 3/2014 | Dubs | |
| 8,767,990 B2 | 7/2014 | Spragge | |
| 8,903,112 B2 | 12/2014 | Lu et al. | |
| D722,167 S | 2/2015 | Li | |
| D722,168 S | 2/2015 | Darkes | |
| 9,014,407 B2 * | 4/2015 | Boguslavskij | H02J 7/025 |
| | | | 381/315 |
| 9,071,917 B2 | 6/2015 | Neumeyer et al. | |
| 9,113,276 B2 * | 8/2015 | Kill | H04R 25/602 |
| 9,319,811 B2 * | 4/2016 | Etwil | H04R 1/10 |
| D757,944 S | 5/2016 | Bishop | |
| D757,945 S | 5/2016 | Bishop | |
| 9,621,999 B2 | 4/2017 | Sudan | |
| 2002/0196957 A1 | 12/2002 | Andersen | |
| 2007/0047751 A1 | 3/2007 | Heerlein et al. | |
| 2008/0044049 A1 | 2/2008 | Ho et al. | |
| 2008/0240480 A1 * | 10/2008 | Pinnell | H04R 25/602 |
| | | | 381/323 |
| 2009/0010462 A1 | 1/2009 | Ekchian et al. | |
| 2009/0257610 A1 | 10/2009 | Wu et al. | |
| 2010/0226519 A1 | 9/2010 | Spragge et al. | |
| 2010/0290655 A1 | 11/2010 | Takeda et al. | |
| 2011/0200218 A1 | 8/2011 | Borregaard | |
| 2013/0195303 A1 | 8/2013 | Tada | |
| 2013/0259278 A1 | 10/2013 | Kill et al. | |
| 2013/0328524 A1 * | 12/2013 | Bartulec | H02J 7/025 |
| | | | 320/108 |
| 2013/0329925 A1 | 12/2013 | Boguslavskij et al. | |
| 2014/0177893 A1 | 6/2014 | Lu et al. | |
| 2015/0249895 A1 | 9/2015 | Etwil et al. | |
| 2015/0326982 A1 * | 11/2015 | Sudan | H04R 25/305 |
| | | | 381/323 |
| 2016/0365751 A1 * | 12/2016 | Hatanaka | H02J 7/32 |
| 2017/0118558 A1 | 4/2017 | Renken et al. | |
| 2017/0188162 A1 * | 6/2017 | Flaig | H04R 25/602 |

OTHER PUBLICATIONS

International Preliminary Report on Patentability for PCT/US2015/036128 dated Dec. 29, 2016.
International Search Report for PCT/US2015/036119 dated Sep. 10, 2015.
Written Opinion of the ISA for PCT/US2015/036119 dated Sep. 10, 2015.
Written Opinion of the ISA for PCT/US2015/036128 dated Feb. 10, 2016.
International Search Report for PCT/US2015/036128 dated Feb. 10, 2016.

* cited by examiner

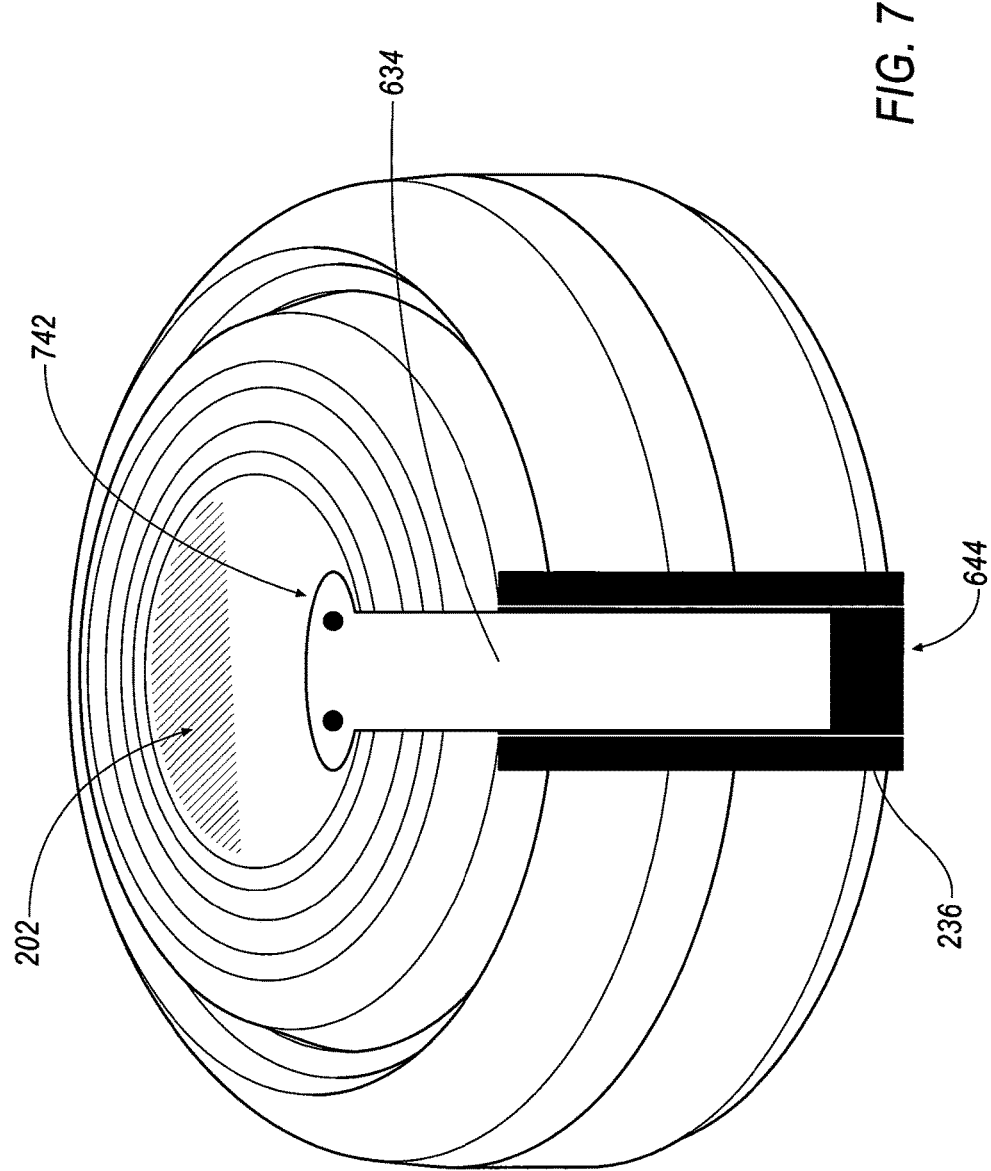

HEARING AID BATTERY DOOR MODULE

CROSS REFERENCE TO RELATED APPLICATION

This U.S. nonprovisional application is the 35 USC § 371 national phase of PCT application no. PCT/US2015/036128, filed on Jun. 17, 2015, which claims priority to U.S. provisional application No. 62/048,465, filed on Sep. 10, 2014, and 62/013,606, filed Jun. 18, 2014. Each of these documents is hereby incorporated by reference in its entirety.

TECHNICAL FIELD

This invention relates to battery-powered hearing aid devices. More specifically, this invention relates to battery door modules of hearing aid devices.

BACKGROUND

A hearing aid is an electronic device known to alleviate hearing loss of a human. Generally, the hearing aid captures sounds from the environment using one or more microphones and amplifies the captured sounds electrically according to a hearing aid prescription. Digital representations of the amplified signals are converted back into electrical signals suitable for driving an output transducer of the hearing aid for generating sound waves perceivable to its user.

Most traditional hearing aids are powered by single use (e.g., disposable) batteries or button cells such as zinc-air batteries. In fact, the sensitive electronics within these hearing aids are specifically designed for use with single use batteries. For example, the electronics are designed to accommodate or tolerate the voltages of single use batteries and discharge currents therefrom.

While single use batteries such as zinc-air batteries and other disposable batteries possess satisfactory energy densities and relatively inexpensive production costs, these batteries are single use, and once depleted, must be replaced. The hearing aid user must replace spent hearing aid batteries many times during the lifetime of the hearing aid. Thus, the advantage of a relatively low cost of a single hearing aid battery is lost because the battery must be replaced frequently, which aggregates battery costs. And, the small sizes of these batteries can make handling the batteries and replacing spend batteries in hearing aids difficult.

Rechargeable batteries or button cells offer the benefit of being rechargeable and reusable. However, the voltages or discharge currents from rechargeable batteries (e.g., silver zinc and lithium based batteries) are not compatible with the electronics in the hearing aids, because these electronics are designed for use with lower voltage single use batteries. For instance, common zinc-air hearing aid batteries typically include a maximum voltage of about 1.45 V under load, and a suitably sized rechargeable silver-zinc battery may possess a maximum voltage of about 1.86 V or greater under load. This maximum voltage corresponding to the rechargeable silver-zinc battery may exceed voltage thresholds of existing electronics within the hearing aid. Thus, the simple replacement of a single use battery with a suitably sized rechargeable battery risks damaging a hearing aid's sensitive electronics.

SUMMARY

The present invention provides a battery door module for a hearing aid device. The module includes a battery casing configured to receive an annular battery defining a battery axis that extends substantially perpendicular to a longitudinal axis of the battery door module when the battery casing receives the battery. The battery includes a first side corresponding to an output terminal of the battery and a second side disposed on an opposite side of the battery than the first side and at least partially enclosed by the battery casing. The second side corresponds to a negative terminal of the battery. The battery also includes a circumferential side wall defining an outer periphery of the battery that extends between the first side and the second side. The side wall corresponds to a positive terminal of the battery. The module further includes an electronics casing enclosing a voltage regulator, a printed circuit board assembly, and at least a portion of two charging elements. The module also includes at least one attachment member disposed on at least one of the battery casing or the electronic casing and allowing the battery door module to attach to a shell portion of the hearing device. The battery door module is movable relative to the shell portion between an open position and a closed position.

Embodiments of the present invention may include one or more of the following optional features. In some embodiments, the at least one attachment member includes a first attachment that connects to the shell portion of the hearing aid device when the battery door module is in the closed position. The at least one attachment member may also include a second attachment member rotatably supported by the shell portion of the hearing aid device and permitting the moving of the battery door module relative to the shell portion between the open position and the closed position. The shell portion of the hearing aid device may enclose electrical components including at least one of a microphone, a signal processor, an audio amplifier, electrical circuitry, or a loud speaker. The printed circuit board assembly and the charging elements may reside outside the shell portion when the battery door module is in the closed position.

In some examples, the battery casing may include a battery cover portion and a retention portion. The battery cover portion has a curved profile conforming to the outer periphery of the battery and enclosing at least a portion of the side wall when the battery casing receives the battery. The retention portion is substantially co-axial with the battery axis and opposing the second side when the battery casing receives the battery. The retention portion may further include an outer diameter equal to at least a diameter of the second side and an inner diameter defining an aperture that exposes an inner surface of the second side of the battery. The battery may be either one of a reduced voltage battery and an increased voltage battery.

The printed circuit board assembly may further include a plurality of contact elements. Each contact element may be configured to conduct voltage between the printed circuit board assembly and a corresponding one of the negative and positive terminals of the battery and the output terminal of the battery associated with a regulated output voltage from the printed circuit board assembly. The printed circuit board assembly and the voltage regulator are unpowered by the battery when at least one of the contact elements is electrically disconnected from the battery. The voltage conducted from the battery bypasses the voltage regulator when all of the contact elements are electrically connected to the battery and the positive terminal of the battery is electrically connected to the output terminal of the battery. At least one of the plurality of contact elements may be gold-plated.

In some embodiments, the electronics casing defines a key feature. The key feature receives a key-insulator configured to isolate voltages associated with the negative terminal, the positive terminal, and the output terminal of the battery from one another. The key-insulator may include a first insulation channel configured to receive a first conduction strip. The first conduction strip conducts voltage between the negative terminal of the battery and the printed circuit board assembly. The key-insulator further includes a second insulation channel extending substantially parallel to the first insulation channel and configured to receive a second conduction strip. The second conduction strip provides a regulated output voltage from the printed circuit board assembly to the output terminal of the battery. The first and second conduction strips may be formed from one or more electrically conductive materials (e.g., nickel, gold, silver, copper, alloys thereof, or the like).

In some examples, an insulator cap encloses the first side of the battery and a portion of the side wall of the battery. In these examples, the insulator cap is configured to contact a conduction terminal at a location associated with the portion of the side wall enclosed by the insulator cap to prevent a regulated output voltage from the printed circuit board assembly to the output terminal of the battery from contacting the positive terminal of the battery at a remaining portion of the side wall not enclosed by the insulator cap.

In some examples, each of the two charging elements include a tip portion exposed from the battery door module that permits charging of the battery by an external charger without having to remove the battery door module from the shell portion. The electronics casing may entirely enclose the charging elements. The charging elements may be further configured to electrically connect to charging contacts of an external charger that extend into the electronics casing to charge the battery. The charging elements may be further configured to wirelessly connect to an external charger to charge the battery. In some examples, the two charging elements provide a charging voltage to the printed circuit board assembly to charge the battery during a charging event.

The battery door module may also include a first conduction disc substantially co-axial with the battery axis and electrically connected to the first side of the battery when the battery casing receives the battery. The first conduction disc provides a regulated output voltage from the printed circuit board assembly to the output terminal of the battery at the first side. The module may further include an insulating disc disposed between the first conduction disc and the battery at the first side to prevent the regulated output voltage provided to the output terminal of the battery from contacting the positive terminal of the battery at the side wall.

The voltage regulator may determine whether the battery is an increased voltage battery or a reduced voltage battery based upon a magnitude of input voltage supplied from the battery. The voltage regulator may also include reducing the magnitude of the input voltage supplied from the battery when the battery is an increased voltage battery to ensure that a resulting output voltage for powering the hearing aid device does not exceed a maximum output voltage. A reed switch may block the charging elements from an output voltage of the battery that powers the hearing aid device.

Another aspect of the disclosure provides a method for assembling a hearing aid device. The method includes providing a battery door module including a battery casing configured to receive an annular battery and an electronics casing enclosing a voltage regulator, a printed circuit board assembly, and a portion of one or more charging pins. The method further includes attaching the battery door module to a shell portion enclosing electrical components.

This aspect may include one or more of the following optional features. The battery door module may attach to the shell portion by connecting at least one attachment member disposed on at least one of the battery casing or the electronics casing to the shell portion.

The details of one or more embodiments of the disclosure are set forth in the accompanying drawings and the description below. Other aspects, features, and advantages will be apparent from the description and drawings, and from the claims.

DESCRIPTION OF DRAWINGS

FIG. 7 is a perspective view of an annular battery and a plastic key-insulator of the BDM of FIG. 1, in accordance with the present disclosure.

Like reference symbols in the various drawings indicate like elements.

These figures are provided as examples and are not intended to limit the scope of the claimed invention.

DETAILED DESCRIPTION

Figure 1:
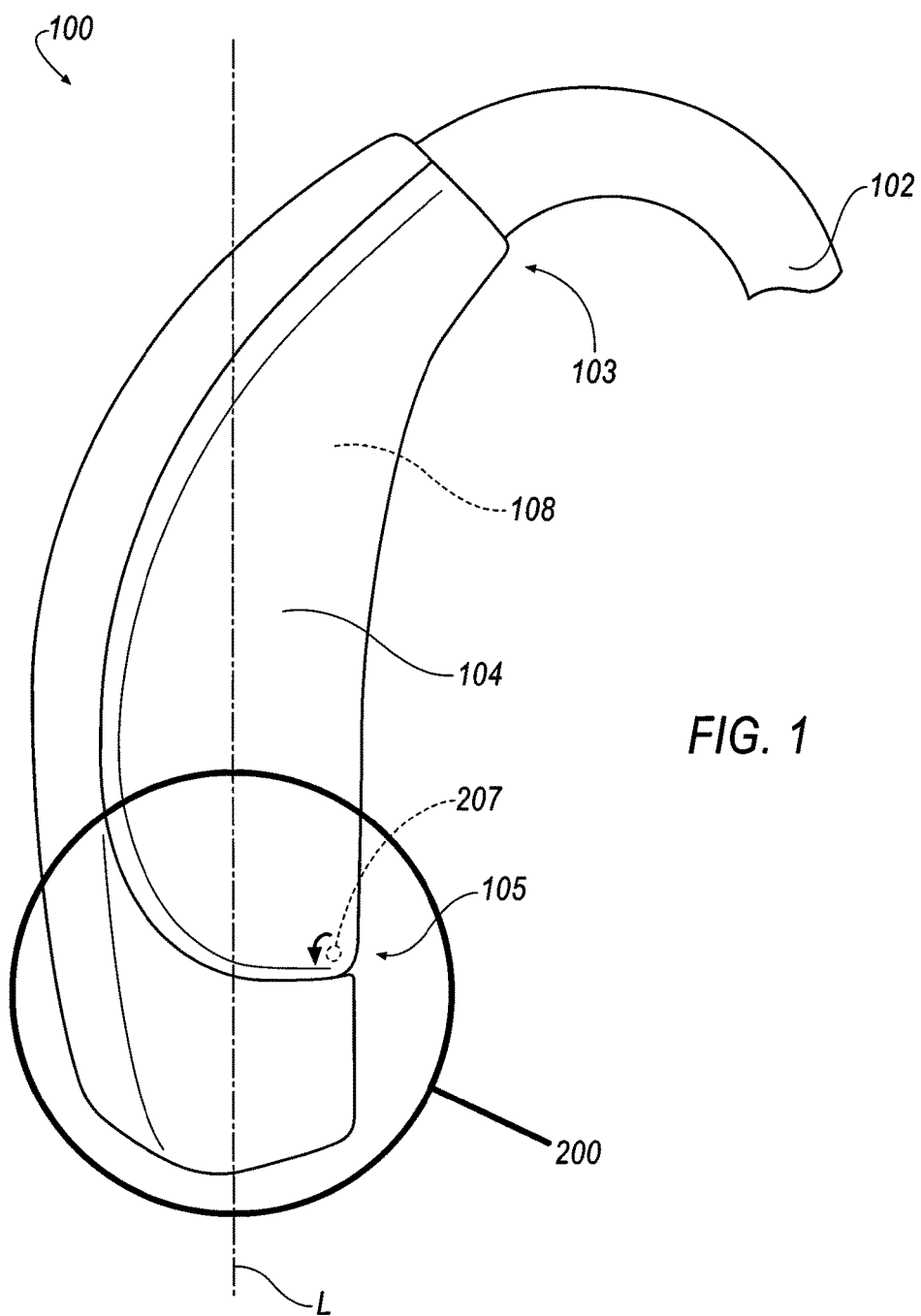
FIG. 1 is a perspective view of a battery-powered hearing aid device including a shell portion and a battery door module (BDM), according to one embodiment of the present invention.

Referring to FIG. 1, a perspective view shows a battery-powered hearing aid device 100. The hearing aid device 100 includes an earpiece 102, a shell portion 104 and a battery door module (BDM) 200 defining a longitudinal axis L. The shell portion 104 may enclose electrical components 108 such as, but not limited to, a microphone, a signal processor, an audio amplifier, related electrical circuitry, and a loud speaker or other audio output device. A first end 103 of the shell portion 104, angled away from the longitudinal axis L of the BDM 200, may be coupled to the ear piece 102 for securing the hearing aid device 100 to an ear of a user. A second end 105 of the shell portion 104 may attach to the BDM 200. In the example shown, the shell portion 104 and earpiece 102 correspond to hearing aid device 100, whereat the BDM 200 is configured to attach to the hearing aid device. The BDM 200 may receive a battery 202 (FIGS. 2A and 2B) for powering the electrical components 108 within the shell portion 104. In some embodiments, the BDM 200 provides recharging capabilities of the battery 202 without having to remove the BDM 200 from the shell portion 104 and/or remove the battery 202 from the BDM 200. For example, when the BDM attaches to the shell portion of the hearing aid, the hearing aid device including the shell portion and the BDM can be placed in a recharging device as a unitary device, i.e., without having to remove the battery from the BDM or removing the BDM from the hearing aid. The BDM may be movable relative to the shell portion 104 between an open position for inserting the battery 202 into the BDM or removing the battery 202 from the BDM. FIG. 1 shows the BDM in the closed position relative to the shell portion 104. In some embodiments, the BDM may rotate (e.g., counter clockwise) about a hinge pivot axis 207 to move the BDM from the closed position to the open position.

Figure 2A:
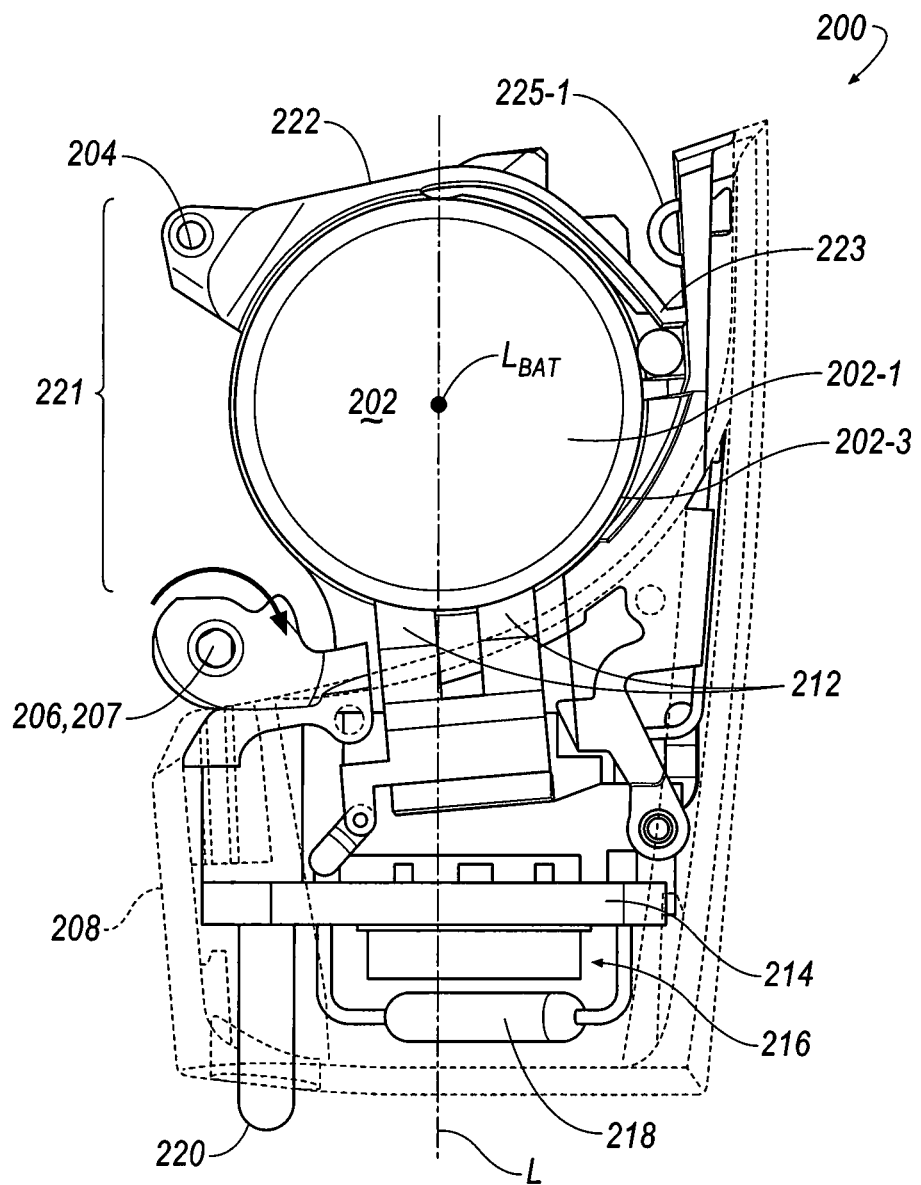
FIGS. 2A and 2B are side and perspective views of the BDM of FIG. 1.
Figure 2B:
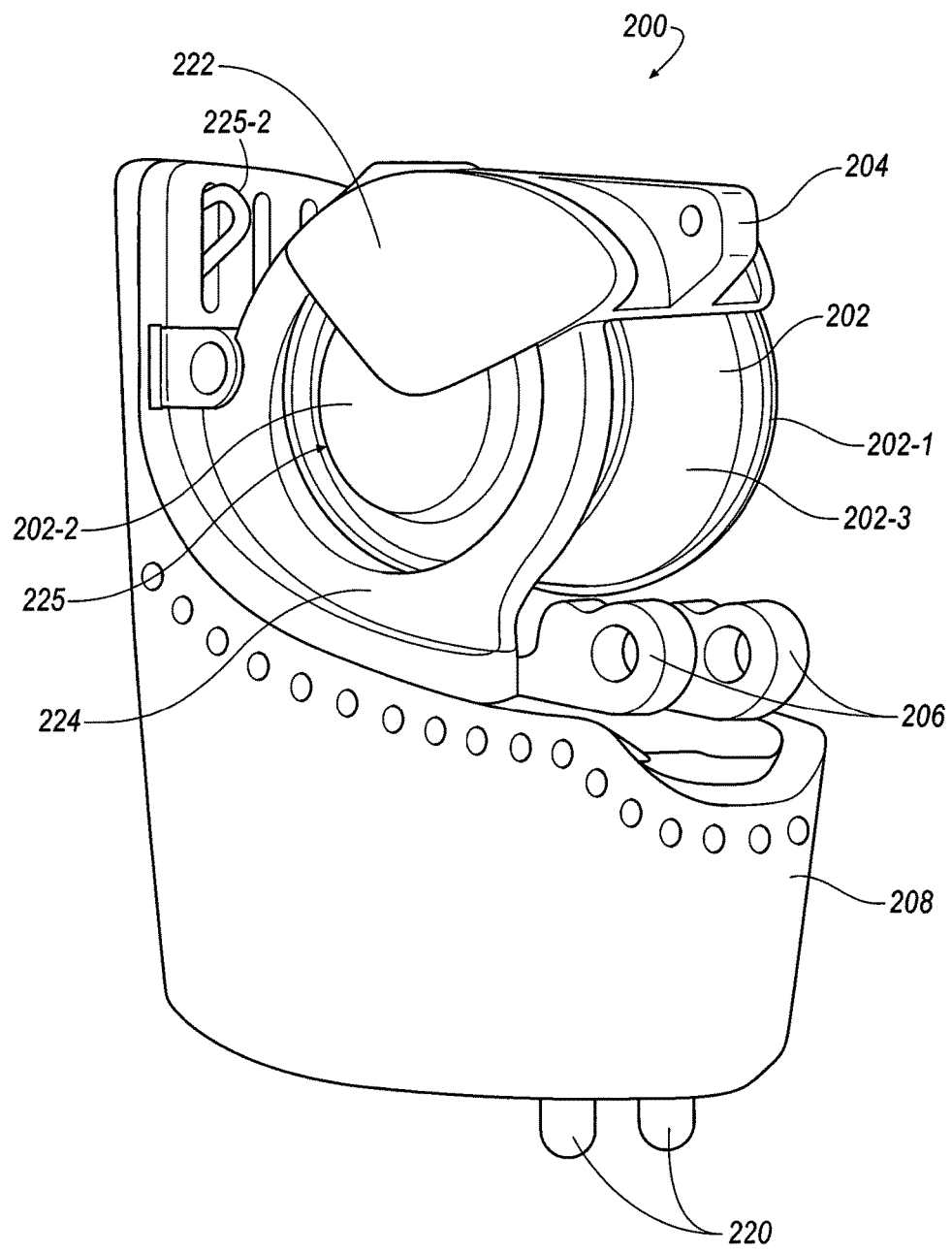

Referring to FIGS. 2A and 2B, in some embodiments, the BDM 200 includes an electronics casing 208 and a battery casing 221. The battery casing 221 may be disposed between the second end 105 of the shell portion 104 and the electronics casing 208. In some examples, the electronics casing 208 is integral to the battery casing 221. In other examples, the electronics casing 208 and the battery casing 221 are separate components that connect to one another to form the BDM. The battery casing 221 may be configured to receive the battery 202 defining a battery axis $L_{BAT}$. When the battery casing 221 receives the battery 202, the battery axis $L_{BAT}$ extends substantially perpendicular to the longitudinal axis L of the BDM.

The BDM 200 may include at least one attachment member 204, 206 disposed on at least one of the battery casing 221 or the electronics casing 208 that allows the BDM to attach to the shell portion 104. In some embodiments, a first attachment member 204 disposed on the battery casing 221 connects to the shell portion 104 when the BDM is in the closed position. Additionally or alternatively, the BDM may include a second attachment member 206 rotatably supported by the shell portion 104 to permit the BDM to move relative to the shell portion 104 between the open position and the closed position. For instance, a pin may rotatably support the second attachment member 206 about the hinge pivot axis 207.

In some embodiments, the BDM 200 is configured to accept either one of a reduced voltage battery (e.g., a disposable battery (e.g., a zinc air disposable battery, alkaline manganese dioxide battery, or other disposable battery) and an increased voltage battery (e.g., a rechargeable battery (e.g., a rechargeable silver zinc or lithium ion battery) or an increased voltage disposable battery). In some examples, the reduced voltage battery has a maximum open circuit voltage of about 1.6 V or less (e.g., from about 0.75 V to about 1.6 V, or from about 1.45 V to about 1.55 V). In other examples, the increased voltage battery has a maximum voltage under load of greater than about 1.6 V (e.g., from about 1.6 V to about 3.0 V or from about 1.65 V to about 2.5 V). For example, the battery 202 may be a reduced voltage battery that can include a zinc-air battery, an alkaline manganese dioxide battery, or a nickel-metal hydride (NiMH) battery; or the battery 202 may be an increased voltage battery that can include a silver zinc battery or a lithium ion battery. Zinc-air batteries are generally non-rechargeable. NiMH, lithium ion, and silver-zinc batteries are generally rechargeable. Hereinafter, the reduced voltage battery will simply be referred to as the zinc-air battery and the increased voltage battery will simply be referred to as the silver-zinc battery; however, any battery type not exceeding a voltage threshold indicates the "reduced voltage battery" and any battery type exceeding the voltage threshold indicates the "increased voltage battery".

In the examples shown, the battery 202 includes a first side 202-1, a second side 202-2 disposed on an opposite side of the battery 202 than the first side 202-1, and a circumferential side wall 202-3 defining an outer periphery of the battery 202 that extends between the first side 202-1 and the second side 202-2. In some embodiments, the first side 202-1 corresponds to an output terminal ($BAT_{OUT}$), the second side 202-2 corresponds to a negative terminal (BAT−) and the side wall 202-3 corresponds to a positive terminal (BAT+). In some embodiments, the battery casing 221 is configured to receive either one of size 13 and 312 batteries. In other embodiments, separate battery casings 221 may be designed for receiving corresponding ones of size 13 and 312 batteries.

In some embodiments, the battery casing 221 includes a battery cover portion 222 and a retention portion 224. The battery cover portion 222 may include a curved profile conforming to the outer periphery of the battery 202 and enclosing a portion of the side wall 202-3 when the battery casing 221 receives the battery 202. In some examples, the cover portion 222 connects to the electronics casing 208. In other examples, the cover portion 222 is integrally formed with the electronics casing 208. In some embodiments, the cover portion 222 is operative as or comprises a live hinge to flex and pivot at or about a point 223 proximate to an area whereat the cover portion 222 and the electronics casing 208 intersect. For instance, the cover portion 222 may be flexed or pivoted upward while the portion of the side-wall 202-3 of the battery 202 is enclosed therein. Conversely, the cover portion 222 may be sprung downward to a relaxed state when the battery 202 is removed in a direction away from the retention portion 224.

The retention portion 224 may include a disc disposed substantially co-axial with the battery axis $L_{BAT}$ and opposing the second side 202-2 when the battery casing 221 receives the battery 202. In some examples, the retention portion 224 includes an outer diameter equal to at least a diameter of the second side 202-2 and an inner diameter defining an aperture 225 that exposes an inner surface of the second side 202-2 of the battery 202. Accordingly, the outer diameter of the battery 202 at the second side 202-2 is enclosed by the retention portion 224, thereby restricting access to the battery 202 at the second side 202-2 by a user's finger. Conversely, the first side 202-1 of the battery 202 may be entirely exposed to permit the battery 202 to be freely inserted into or removed from the BDM 200.

In some embodiments, the electronics casing 208 encloses power management components including one or more of a voltage regulator 216, a printed circuit board assembly (PCBA) 214, a reed switch 218 and at least a portion of charging elements 220. In some examples, the charging elements 220 include charging pins; while, in other examples, the charging elements 220 include charging pads. In some examples, the charging elements 220 include an electrical coil or antenna for wireless charging. In some embodiments, the voltage regulator 216 is implemented with an application-specific-integrated circuit (ASIC) upon the PCBA 214 to provide a voltage regulating circuit 500 (FIG. 4) for regulating output voltage ($V_{OUT}$) from the battery 202 that powers the electrical components 108 within the shell portion 104 of the existing hearing aid device 100. Accordingly, the voltage regulator 216 may provide a regulated $V_{OUT}$ to the battery 202 when the battery 202 is an increased voltage battery 202. The voltage regulating circuit 500 provided by the PCBA 214 implementing the voltage regulator 216 is described in further detail below with reference to FIG. 4. In some embodiments, the reed switch 218 blocks the charging elements 220 from receiving the output voltage $V_{OUT}$ from the battery 202. As used herein, the $BAT_{OUT}$ and the $V_{OUT}$ will be used interchangeably.

In other embodiments, the electronics casing 208 does not enclose the voltage regulator 216 or the PCBA 214, but rather the voltage regulator 216 and PCBA 214 are attached to one of the first or second sides 202-1, 202-2, respectively, or the side wall 202-3 of the battery 202. Here, rather than using contact elements 212, 232, 234 (FIG. 3) of the PCBA 214 for connecting to the battery 202, permanent connections may instead be used between the battery terminals and the PCBA 214. The permanent connections may include spot welded tabs, soldered tabs, or the welds. The charging elements 220 may still be enclosed by the electronics casing 208 for providing charging voltage to the battery 202 through the PCBA 214 using similar features as described above.

In some embodiments, the electronics casing 208 further includes first and second contact elements 225-1 and 225-2, hereinafter referred to as contact fingers 225-1 and 225-2. In some examples, the contact fingers 225-1 and 225-2 are gold-plated. In the example shown, the contact fingers 225-1 and 225-2 protrude from the electronics casing 208. The first contact finger 225-1 (FIG. 2A) electrically connects to a terminal 520-1 (FIG. 4) of the PCBA 214 when the BDM 200 is in the closed position to provide a negative input voltage ($V_{IN}$−) from the negative terminal BAT− at the second side 202-2 of the battery 202 to the PCBA 214. The second contact finger 225-2 (FIG. 2B) electrically connects to an output terminal 540 (FIG. 4) of the PCBA 214 when the BDM 200 is in the closed position to provide the regulated output voltage ($V_{OUT}$) from the voltage regulator 216 to the output terminal $BAT_{OUT}$ at the first side 202-1 of the battery 202.

Figure 3:
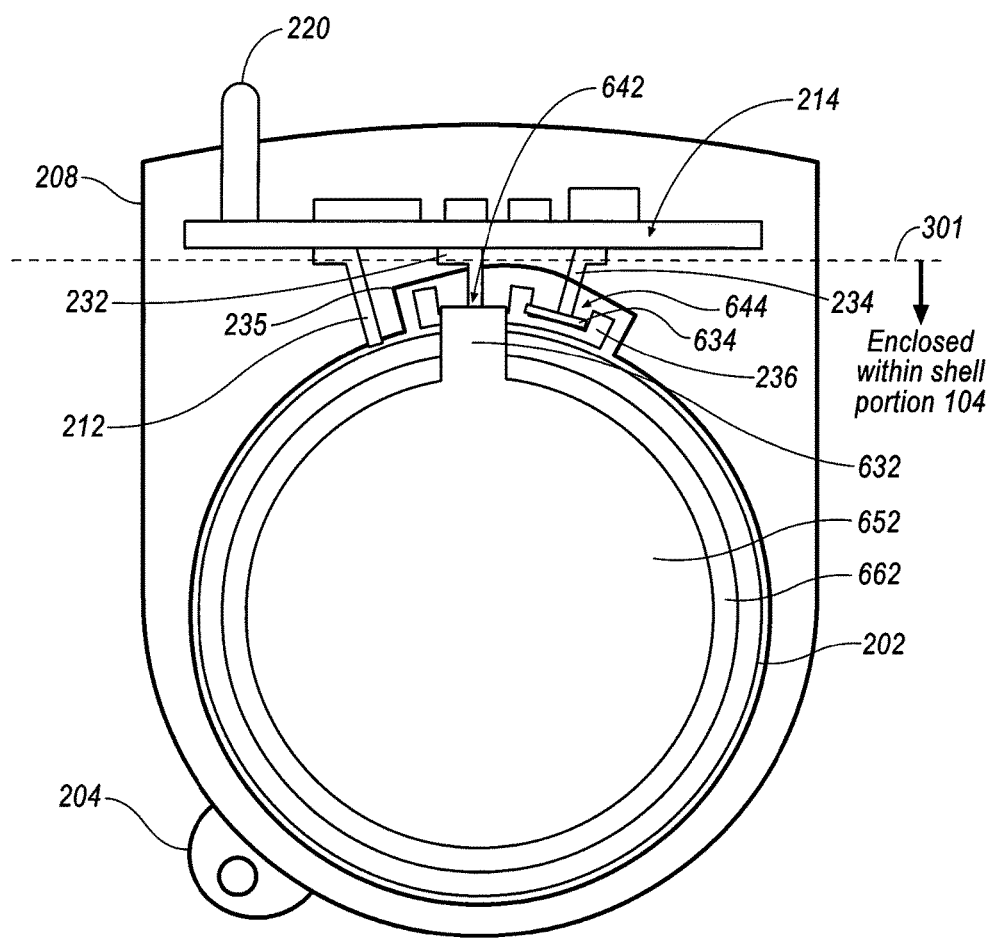
FIG. 3 is a schematic view of a BDM according to one embodiment of the present invention.

FIG. 3 shows a schematic view of the BDM 200. When the BDM 200 is in the closed position by securely attaching to the shell portion 104, all features below dashed horizontal line 301 are enclosed within the shell portion 104. Thus, the PCBA 214 and the charging pins 220 are not enclosed within the shell portion 104 when the BDM 200 is in the closed position. In some embodiments, the PCBA 214 includes the plurality of contact elements 212, 234, 232 that electrically connect the PCBA 214 to the corresponding ones of the BAT+, the BAT−, and the $BAT_{OUT}$ of the battery 202. For example, contact element 212 may conduct voltage from the BAT+ at the side wall 202-3 of the battery 202, contact element 232 may provide the regulated output voltage ($V_{OUT}$) from the voltage regulator 216 to the $BAT_{OUT}$ at the first side 202-1 of the battery 202 when the battery 202 is an increased voltage battery, and contact element 234 may conduct voltage from the BAT− at the second side 202-2 of the battery 202. The contact elements 212, 232, 234 may be formed by stamping one or more electrically conductive metals. In some embodiments, at least one of the contact elements 212, 232, 234 of the PCBA 214 is gold-plated.

In some embodiments, the electronics casing 208 of the BDM 200 defines a key feature 235 for receiving a key-insulator 236. The key-insulator 236 may be formed from plastic or from any combination of materials having insulating characteristics. When the battery 202 is received by the electronics casing 208, the key-insulator 236 defines a length extending between the first side 202-1 of the battery 202 and the second side 202-2 of the battery 202 and include a first surface opposing the side wall (202-3) of the battery 202 and a second surface disposed on an opposite side of the key-insulator 236 than the first surface. The key-insulator 236 may be configured to isolate voltages associated with the BAT−, the BAT+, and the $BAT_{OUT}$ of the battery 202 from one another. In some examples, the second surface of the key-insulator 236 defines first and second insulation channels 642, 644 extending substantially parallel to one another. Described in greater detail below with reference to FIGS. 6A and 6B, the first insulation channel 642 is configured to receive a conduction terminal 632 (hereinafter 'conduction strip') associated with the contact element 232 of the PCBA 214 and the second insulation channel 644 is configured to receive a conduction terminal 634 (hereinafter 'conduction strip') associated with the contact element 234 of the PCBA 214. For example, the contact element 232 may include an edge that swipes into the conduction strip 632 and the contact element 234 may include an edge that swipes into the conduction strip 634. In some embodiments, the conduction strips 632, 634 are formed from at least one of nickel, nickel alloy, gold or other conducting metals.

In some embodiments, the charging elements 220 are at opposite ends to conform to sizing constraints when the battery 202 is a 312 size. In the example shown, the term "opposite ends" refers to one charging element (e.g., pin) proximate to the first side 202-1 of the battery 202 and the other charging element (e.g., pin) proximate to the second side 202-2 of the battery 202. In another implementation, the charging elements 220 may be side-by-side. In some examples, the charging elements 220 are gold plated. In the example shown, the charging elements 220 include pins having tips exposed from the electronics casing 208, thereby enabling the hearing aid device 100 to be charged by an external charger 900 (FIG. 17) without having to remove the BDM 200 from the shell portion 104. Accordingly, the charging pins 220 may conduct voltage from the external charger 900 when coupled thereto and provide a charging voltage to the PCBA 214 for charging the battery 202.

In some examples, the charging elements 220 may include pins or pads entirely recessed within the electronics casing 208. In these examples, the external charger 900 may include contact elements configured to extend into the electronics casing 208 to mate with the charging elements. Charging pads disposed on the PCBA 214 may be utilized in lieu of the charging pins for electrically connecting to the contact elements of the external charger 900. In other examples, the charging elements 220 may include pins or pads substantially flush with the bottom surface of the BDM 200.

In some embodiments, the charging elements 220 are press fit into the electronics casing 208 and may be separately soldered to connect to the PCBA 214. In some embodiments, the electronics casing 208 includes an induction coil electrically connected to the PCBA 214 for receiving power from an electromagnetic field generated by an external induction charger to charge the battery 202 via induction charging. In other embodiments, the electronics casing 208 includes an antenna configured for receiving power from a radio frequency signal generated by an external radio frequency charger to charge the battery 202.

Still referring to FIG. 3, in some embodiments, a first conduction disc 652 is disposed substantially co-axial with the battery axis $L_{BAT}$ and electrically connected to the first side 202-1 of the battery 202 when the battery casing 221 receives the battery 202. In these embodiments, the first conduction disc 652 provides the regulated output voltage $V_{OUT}$ to the output terminal ($BAT_{OUT}$) of the battery 202 from the PCBA 214 via the conduction strip 632 and the contact element 232. In some embodiments, the conduction strip 632 extends from the insulation channel 642 and bends to form the first conduction disc 652. The first conduction disc 652 may include a diameter that is less than the diameter of the battery 202. In the example shown, an insulating disc 662 may be disposed between the first conduction disc 652 and the first side 202-1 and the side wall 202-3 of the battery 202 to prevent the regulated output voltage $V_{OUT}$ provided to the $BAT_{OUT}$ of the battery 202 from contacting the BAT+ of the battery 202 at the side wall 202-3. Thus, the insulating disc 662 may protect the battery 202 at the location where the first conduction disc 652 bends into the conduction strip 632 received by the first insulation channel 642 of the plastic key-insulator 236. The insulating disc 662 may include an outer diameter that is greater than the diameter than the conduction disc 652. In other embodiments, the insulating disc 662 is replaced by an insulator cap 302 (FIG. 12) enclosing the first side 202-1 and a portion of the side wall 202-3 of the battery 202 to prevent the regulated output voltage $V_{OUT}$ provided to the $BAT_{OUT}$ of the battery 202 from contacting the BAT+ of the battery 202 at the side wall 202-3. The insulator cap 302 is described in greater detail below with reference to FIGS. 11 and 12. In some embodiments, the insulating disc 662 and the insulator cap 302 include a polymer film available from E.I. du Pont de Nemours and Company, under the trade name Mylar®. An adhesive or epoxy may be selected to hold the insulating disc 662 to the first side 202-1 and the portion of the side wall 202-3 of the battery 202 and to the conduction disc 652.

In other embodiments, the first conduction disc 652 and the insulating disc 662 may be omitted when the battery 202 is a reduced voltage battery. In some examples, the PCBA 214 and the voltage regulator 216 are unpowered by the battery 202 when at least one of the contact elements 212, 232, 234 of the PCB is electrically disconnected from the battery 202. In these examples, when the voltage regulator 216 and the PCBA 214 are not powered by the battery 202, the battery 202 (e.g., reduced voltage battery) directly powers the electrical components of the hearing aid device 100 without using any power for the voltage regulator 216. In other examples, the battery 202 is electrically connected to all contact elements 212, 232, 234 of the PCBA 214 and the BAT+ is electrically connected to the $BAT_{OUT}$ enabling voltage conducted from the battery 202 to effectively bypass the voltage regulator 216 to thereby eliminate any perceivable voltage drops across the voltage regulator 216.

Figure 4:
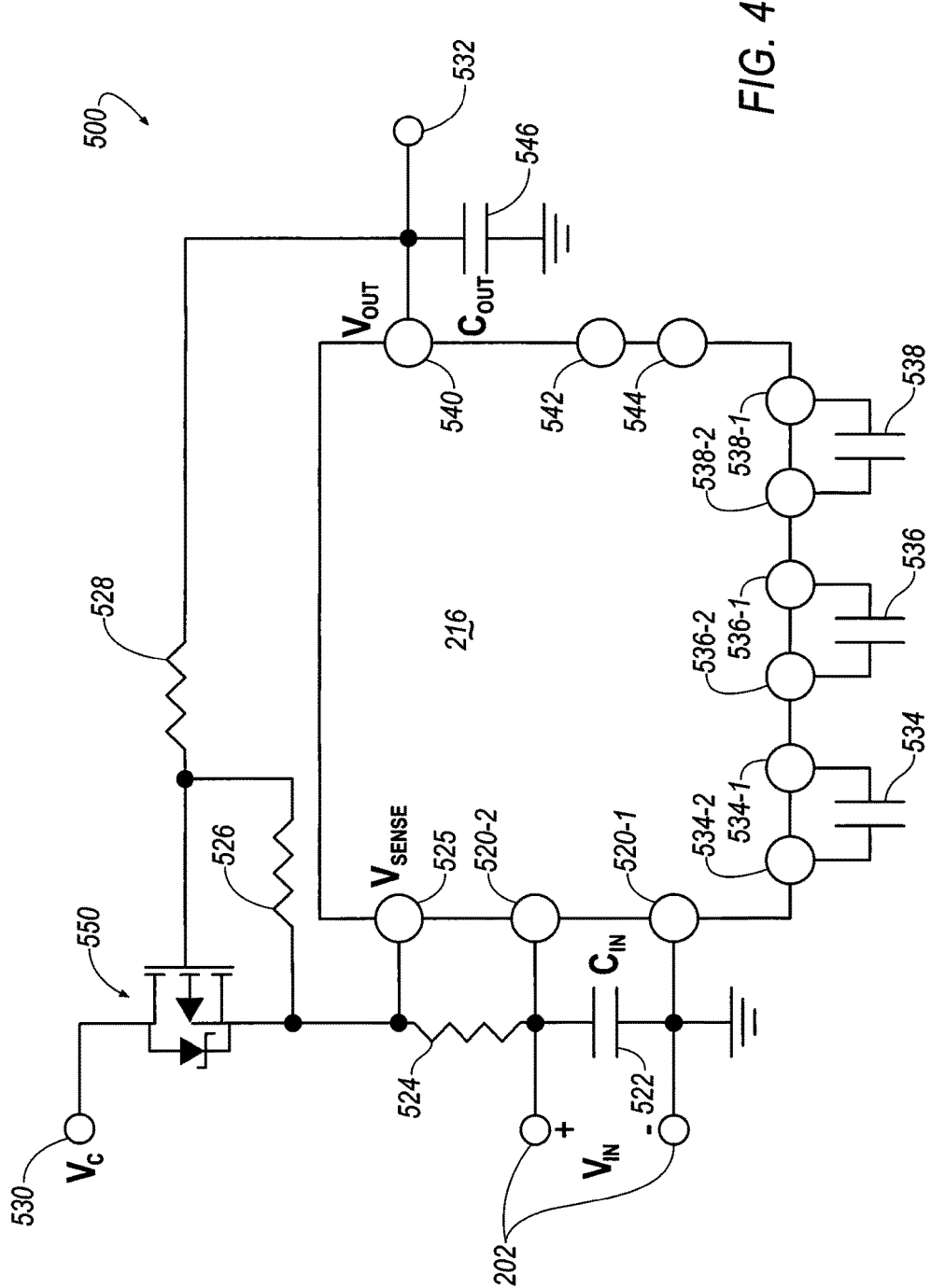
FIG. 4 is a schematic view of a voltage regulating circuit according to one embodiment of the present invention.

Referring to FIG. 4, a schematic of the voltage regulating circuit 500 provided by the voltage regulator 216 implemented with the ASIC upon the PCBA 214 is illustrated. The voltage regulating circuit 500 regulates output voltage ($V_{OUT}$) that powers the electrical components within the shell portion 104 of the hearing aid device 100. The voltage regulating circuit 500 (hereinafter "regulating circuit 500") includes the battery 202, an input capacitor $C_{IN}$ 522, current sense resistor $R_C$ 524, bias resistors $R_{B1}$ 526 and $R_{B2}$ 528, a switch device 550, a charging terminal 530, a hearing aid terminal 532, an output capacitor $C_{OUT}$ 546, and the voltage regulator 216. In a non-limiting example, the $C_{IN}$ 522 and the $C_{OUT}$ 546 are both equal to 1.0 µF, the $R_C$ 524 is equal to 49.9Ω, and the battery resistors $R_{B1}$ 526 and $R_{B2}$ 528 are equal to 499 kΩ and 1.0 MΩ, respectively. In some embodiments, the switch device 550 corresponds to the reed switch 218 in FIG. 2A.

The battery 202 supplies an input voltage ($V_{IN}$) via negative (BAT−) and positive (BAT+) terminals to corresponding terminals 520-1 and 520-2 of the voltage regulator 216. In the illustrated example, the negative and positive terminals 520-1 and 520-2, respectively, of the voltage regulator 216 can collectively be referred to as an "input terminal" of the voltage regulator 216. Based upon the magnitude of the $V_{IN}$ supplied from the battery 202, the voltage regulator 216 provides the $V_{OUT}$ via output terminal 540 for powering the hearing aid terminal 532 electrically connected to one or more of the electrical components of the hearing aid device. Embodiments herein are directed toward the voltage regulator 216 reducing the magnitude of the $V_{IN}$ supplied from the battery 202 when the magnitude of the $V_{IN}$ exceeds an input voltage threshold ($V_{in\_thresh}$) to ensure that the resulting $V_{OUT}$ does not exceed a maximum output voltage ($V_{out\_max}$). As used herein, the term "maximum output voltage ($V_{out\_max}$)" refers to a maximum allowable output voltage that can be utilized to power the electrical components of the hearing aid device without causing harm or damage thereto. In a non-limiting example, the $V_{out\_max}$ is equal to about 1.6 V.

In some embodiments, the voltage regulator 216 may determine whether the battery 202 is either the reduced voltage battery (e.g., a zinc-air battery) or the increased voltage battery (e.g., a silver-zinc or lithium ion battery) based upon the magnitude of the $V_{IN}$ received at the terminals 520-1 and 520-2 of the voltage regulator 216. Thereafter, using the implemented ASIC, the voltage regulator 216 may then ignore any regulating or reducing of the $V_{IN}$ if the battery 202 is determined to be a reduced voltage battery or the voltage regulator 216 may regulate the $V_{IN}$ if the battery 202 is determined to be an increased voltage battery. In some embodiments, the voltage regulator 216 can regulate the voltage using any combination of a switching DC-DC converter and a linear DC-DC converter based upon the magnitude of the $V_{IN}$.

The regulating circuit 500 of FIG. 4 may include one or more flying capacitors. In the example shown, the regulating circuit 500 includes first, second and third flying capacitors $C_1$ 534, $C_2$ 536 and $C_3$ 538, respectively. Each of the flying capacitors is identical, and in a non-limiting example, includes a capacitance of 470 nF. Negative terminals of the flying capacitors are electrically connected to corresponding terminals 534-1, 536-1 and 538-1 of the voltage regulator 216. Positive terminals of the flying capacitors are electrically connected to corresponding terminals 534-2, 536-2 and 538-2 of the voltage regulator 216. The voltage regulator 216 further includes EOL voltage terminals 542 and 544 to configure EOL voltages necessary for configuring how the voltage regulator 216 implemented with the ASIC will signal a low battery warning at the hearing aid terminal 532.

Still referring to FIG. 4, the charging terminal 530 may be selectively electrically connected to a charging device for charging the battery 202 if the battery is of the cell type that is rechargeable, e.g., silver-zinc. Hearing aids must be sufficiently small enough to fit inside the user's ears or just outside the ears. Due to the small size, the charging terminal 530 is constrained to only include two contacts (i.e., positive and negative charging contacts) for electrically connecting to the charging pins 220 of the BDM 200 for charging the battery 202. An additional contact indicating the presence of the charging device is not present. Accordingly, to indicate that the regulating circuit 500 is electrically connected to the charging device and the battery is undergoing the charging event, the voltage regulator 216 includes a sensing terminal 525 for sensing a charging current ($V_{SENSE}$) between the battery 202 and the charging device via the charging contacts of the terminal 530. Specifically, the charging current ($V_{SENSE}$) is sensed by detecting voltage across the current sense resistor $R_C$ 524. The hearing aid device must be shut down (e.g., off mode or stand-by mode) to avoid draining the battery 202 during the charging event and to prevent feedback noise or whistling from occurring during charging. Thus, the voltage regulator 216 may detect the presence of a charge current via the sensing terminal 525 and reduce the $V_{OUT}$ to zero to shut down the hearing aid device during the charging event.

The switch device 550 may be implemented with the PCBA 214. The switch device 550 may be controlled by the output terminal 540 to block any voltage from the charging contacts of the charging terminal 530 when the hearing aid device is being powered via the $V_{OUT}$. It is desirable to block battery voltage from the charging contacts because any exposure to voltage may result in a short circuit or result in an undesirable leakage of current. Accordingly, when there is a presence of $V_{OUT}$ at the output terminal 540, the switch device 550 can turn to an OFF state to block the flow of current to the charging contacts of the charging terminal 530. Likewise, when the sensing terminal 525 detects that the battery 202 is undergoing a charging event, the voltage regulator 216 may reduce the $V_{OUT}$ to zero to turn off the hearing aid device permitting the switch device 550 to transition to an ON state and allow the charging device to fully charge the battery 202. In the illustrated example of FIG. 4, the switch device 550 includes a metal-oxide-semiconductor field-effect transistor (MOSFET). While the illustrated example of FIG. 5 depicts the switch device 550 outside of the voltage regulator 216, some embodiments may include the switch device 550 integrated within the voltage regulator 216.

Figure 5:
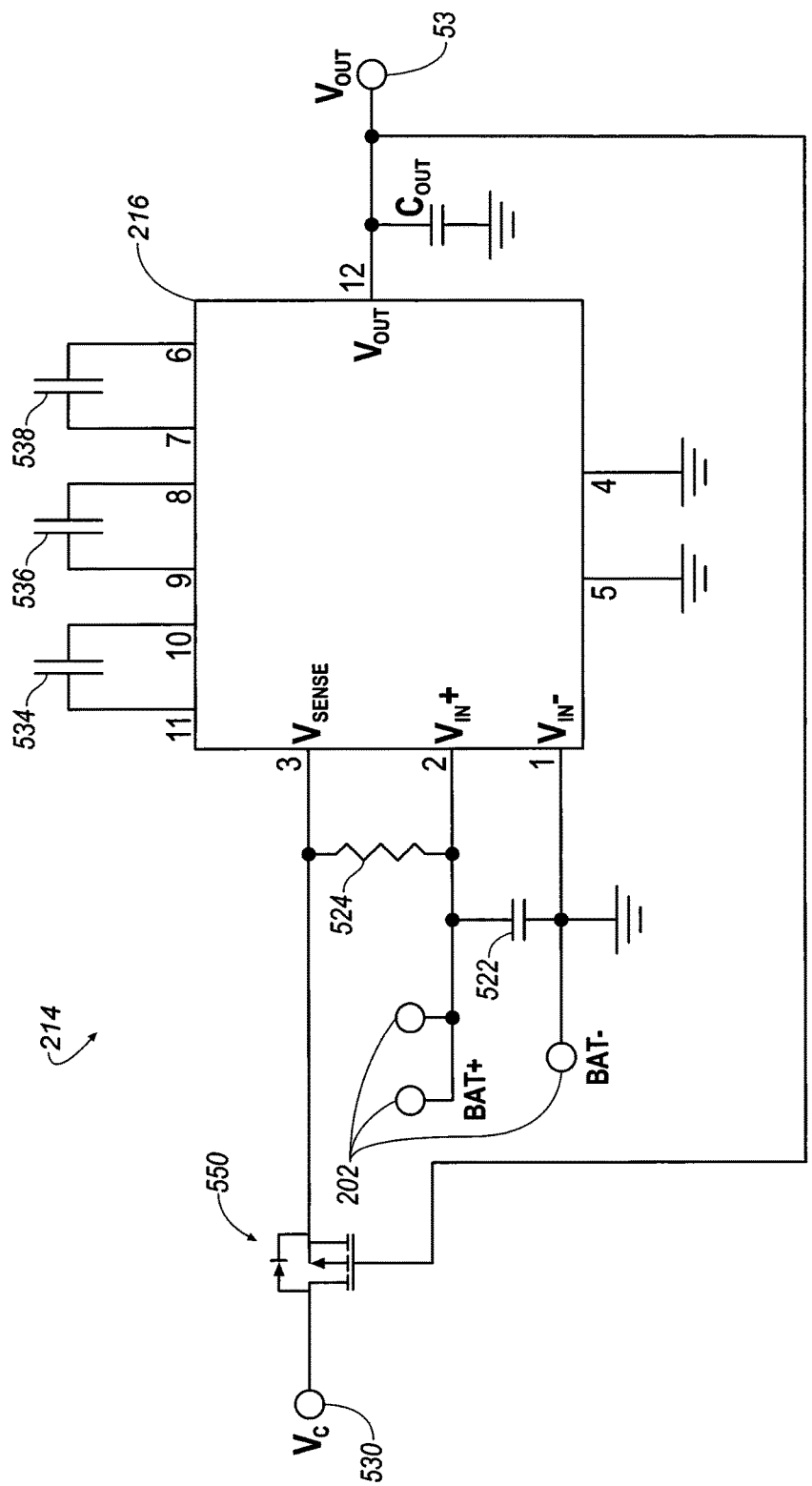
FIG. 5 is a schematic view of an example of a printed circuit board assembly (PCBA) for implementing the voltage regulating circuit of FIG. 4.

FIG. 5 is a schematic of the PCBA 214 for implementing the voltage regulator 216 of FIG. 4. Like numerals in FIG. 5 will correspond to like numerals in FIG. 4 indicating the corresponding features. In the example shown, the PCBA includes a plurality of terminals 1-12. Terminal 1 corresponds to terminal 520-1 of FIG. 4 for receiving a negative input voltage ($V_{IN}-$) from the battery 202, terminal 2 corresponds to terminal 520-2 of FIG. 4 for receiving a positive input voltage ($V_{IN}+$) from the battery 202, and terminal 3 corresponds to terminal 525 of FIG. 4 for receiving the $V_{SENSE}$. Terminals 4 and 5 correspond to the EOL voltage terminals 542 and 544 of FIG. 4 for configuring how the voltage regulator 216 implemented with the ASIC will signal a low battery warning at the hearing aid terminal 532. Terminals 6 and 7 correspond to the negative and positive terminals 538-1 and 538-2, respectively, of the flying capacitor 538; terminals 8 and 9 correspond to the negative and positive terminals 536-1 and 536-2, respectively, of the flying capacitor 536; and terminals 10 and 11 correspond to the negative and positive terminals 534-1 and 534-2, respectively, of the flying capacitor 534. Terminal 12 corresponds to the output terminal 540 of FIG. 4 providing the $V_{OUT}$.

Figure 6A:
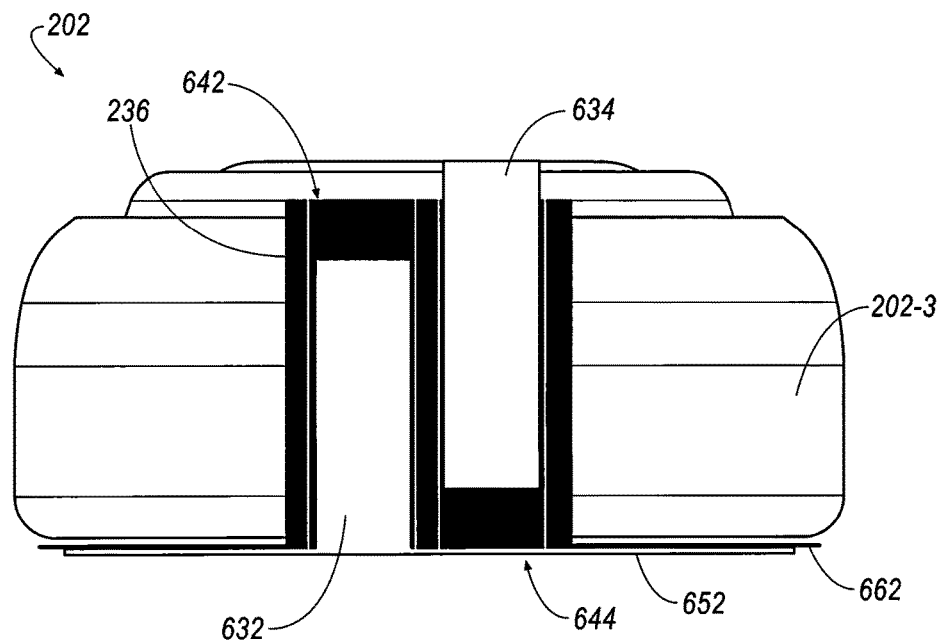
FIGS. 6A and 6B are side views of an annular battery and a plastic key-insulator of the BDM of FIG. 1, in accordance with the present disclosure.
Figure 6B:
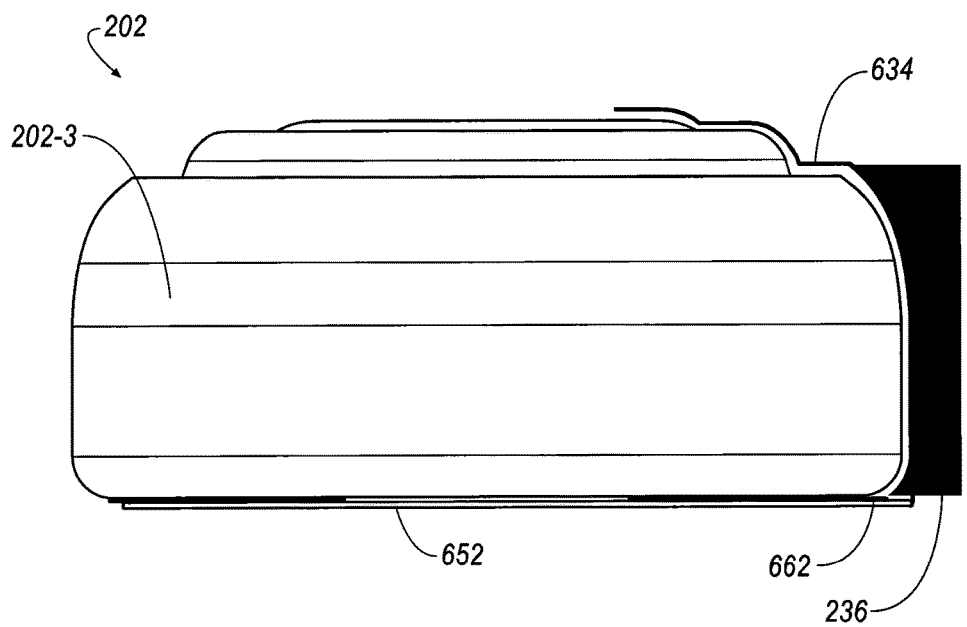

FIGS. 6A and 6B are side views of the annular battery 202 and the key-insulator 236 of the BDM 200 of FIG. 1. The key-insulator 236 may include a curved shape conforming to the shape of the side wall 202-3 of the battery 202. An adhesive, such as an epoxy coating, may be used to hold the key-insulator 236 to the side wall 202-3. The key-insulator 236 may include a shape to engage within the key feature 235 within the BDM 200.

In the examples shown, the conduction strip 632 for conducting voltage from the $BAT_{OUT}$ is received by the first insulation channel 642 and the conduction strip 634 for conducting voltage from the BAT– is received by the second insulation channel 644. In some embodiments, the insulation channels 642 and 644 each include respective lead-in features for ensuring that the corresponding conduction strips 632 and 634 are retained and do not become pulled from the key-insulator 236 by the corresponding contact elements 232 and 234. In some embodiments, adhesive is utilized to hold a tail at the intersection between the conduction disc 652 and the conduction strip 632 in the plastic key-insulator 236. The insulating disc 662 may be disposed between the conduction disc 652 and the battery 202. As shown in FIG. 4B, the conduction strip 634 includes a series of crimps along the contour of the battery to connect to a surface of the battery 202 at the second side 202-2 for conducting voltage from the BAT–. In some embodiments, the key-insulator 236 extends over a shoulder/crimp area at the second side 202-2 to prevent the conduction strip 634 from shorting.

Referring to FIG. 7, a perspective view shows the battery 202 and a portion of the key-insulator 236 located within the BDM 200. In some embodiments, the conduction strip 634 is spot welded at two locations for contacting the negative terminal (BAT–) of the battery 202 at the second side 202-2 proximate area 742. For clarity, the portion of the key-insulator including the first insulation channel 642 for receiving the conduction strip 632 is omitted. As shown with reference to FIG. 2B, the aperture 225 defined by the inner diameter of the retention portion 224 exposes the battery 202 upon a route the conduction strip 634 takes to the key-insulator 236. The sizing of the conduction strip 634 may be minimized to not make contact with hearing aid device contacts at the negative terminal (BAT–) of the battery 202. The location of the conduction strip 634 may be controlled by the plastic key-insulator 236, wherein the key feature 235 (FIG. 3) of the BDM 200 aligns the battery 202 within the BDM 200 to keep the spot welded strips on the top of the lid away from contacts of the hearing aid battery.

Figure 8A:
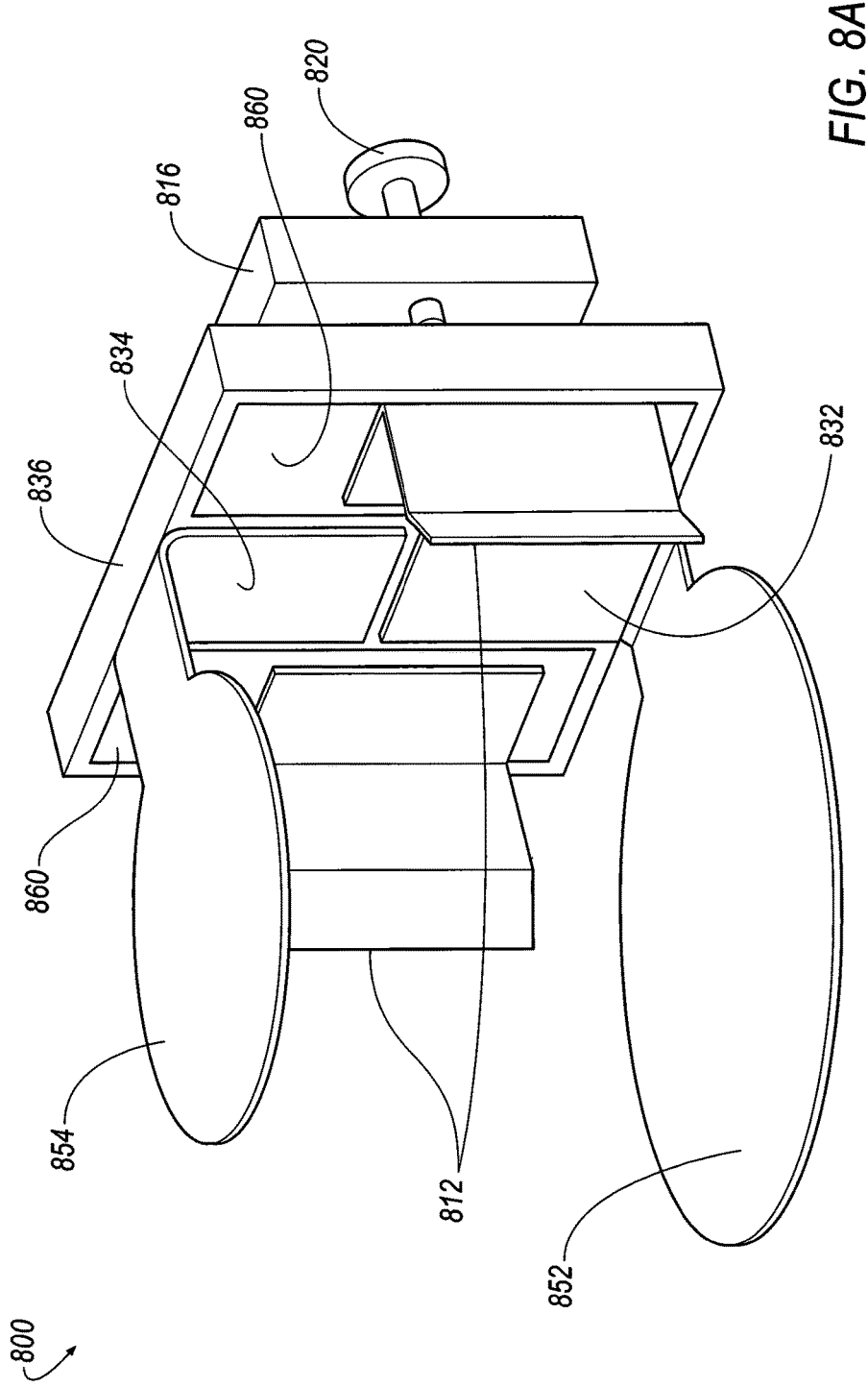
FIGS. 8A-8C illustrate perspective views of a BDM according to one embodiment of the present invention.
Figure 8B:
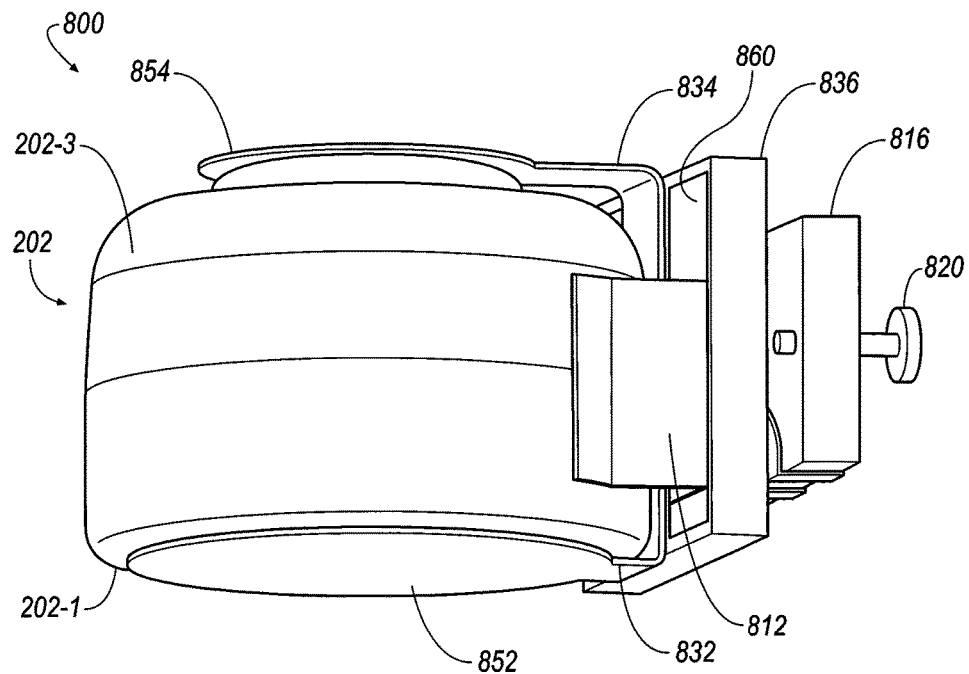
Figure 8C:
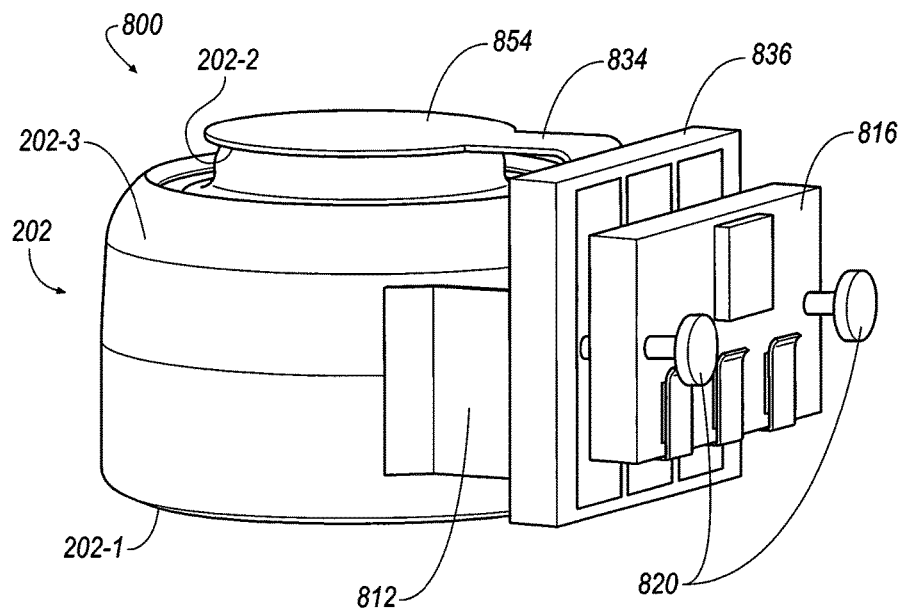

Referring to FIGS. 8A-8C, perspective views of another implementation of a BDM 800 is illustrated. In the examples shown, only components associated with power flow between the battery 202 and a voltage regulator assembly 816 of the BDM 800 are illustrated, while an electronics casing and a battery casing that receives and secures the annular battery 202 are omitted to avoid clutter. The BDM 800 may include one or more engagement features for engaging with a shell portion wherein the annular battery 202 is enclosed within the shell portion and the axis of the annular battery 202 is transverse to a longitudinal axis of the shell portion. The shell portion may enclose electrical components of the hearing aid as described above with reference to the hearing aid device 100 of FIG. 1. The BDM 800 is configured to accept either one of the reduced voltage battery and the increased voltage battery, as described above with reference to the BDM 200 of FIGS. 2A and 2B.

FIG. 8A illustrates the power management components of the BDM 800 without the battery 202 and FIGS. 8B and 8C illustrate the power management components of the BDM 800 including the battery 202. In some embodiments, the voltage regulator assembly 816 includes a voltage regulator implemented with an ASIC upon a PCBA to provide the voltage regulating circuit 500 of FIG. 5 for regulating $V_{OUT}$ from the battery 202. The voltage regulator assembly 816 may further include a reed switch for blocking $V_{OUT}$ from charging elements 820. The voltage regulator assembly 816 may include PCBA contact elements for conducting voltage from respective ones of the BAT+ and BAT− and the regulated output voltage of the battery 202. In some embodiments, charging elements (e.g., pins or pads) 820 may conduct voltage from the external charger 900 (FIG. 17) when coupled thereto and provide a charging voltage to the voltage regulator assembly 816 for charging the battery 202. The charging elements 820 may include any size or shape to connect with the external charger. In some examples, the charging elements 820 are gold plated. Additionally, portions of the charging elements 820 proximate to the tips may be exposed from the electronics casing enabling the charging of the battery by the external charger without having to remove the BDM 800 from the shell portion. In some embodiments, the voltage regulator assembly 816 includes an induction coil for receiving power from an electromagnetic field generated by an external induction charger to charge the battery 202 via induction charging. In other embodiments, the voltage regulator assembly 816 includes an antenna configured for receiving power from a radio frequency signal generated by an external radio frequency charger to charge the battery 202.

In some embodiments, the BDM 800 includes an insulator portion 836 configured to isolate voltages conducted from each of the BAT+, BAT− and $BAT_{OUT}$ that are provided to the voltage regulator assembly 816. In some examples, the insulator portion 836 is plastic. In the example shown, the insulator portion 836 is a printed circuit board material that includes conductive pads for receiving conduction strips from the BAT+ and BAT− and the regulated output voltage of the battery 202. The contact elements 860 may be PCBA pads on the insulator portion 836, and in some examples, the contact elements 860 are gold plated.

In some embodiments, a first conduction disc 852 is disposed substantially co-axial with the battery axis ($L_{BAT}$) and electrically connected to the first side (202-1) of the battery (202). Similar to the first conduction disc 652 of FIGS. 3, 6A, and 6B, the first conduction disc 852 provides the regulated output voltage from the voltage regulator assembly 816 via the conduction strip 832 to the output terminal $BAT_{OUT}$ of the battery 202 at the first side 202-1. In some examples, the conduction strip 832 extends from the respective PCBA pads of the insulator portion 836 and bends to form the conduction disc 852. In some embodiments, a second conduction disc 854 is disposed substantially co-axial with the battery axis ($L_{BAT}$) and electrically connected to the second side 202-2 of the battery 202. The second conduction disc 854 may conduct voltage from the negative terminal BAT− of the battery 202 at the second side (202-2) via the conduction strip 834 and the corresponding contact element 860. In some examples, the conduction strip 834 extends from the respective channel of the insulator portion 836 and bends to form the conduction disc 854. In some embodiments, the conduction protrusions 812 are electrically connected to the side wall 202-3 of the battery 202, and are configured to conduct voltage from the BAT+ to the voltage regulator assembly 816 via the corresponding contact elements 860. In some examples, the conduction strips 832 and 834, the conduction discs 852 and 854 and the conduction protrusions 812 are formed from materials selected from the group consisting of: nickel, nickel alloy, and gold. In other examples, the conduction strips 832 and 834, the conduction discs 852 and 854 and the conduction protrusions 812 are formed from other conducting metals. In other embodiments, conduction retention members can be utilized to replace one or more of the conduction discs 852 and/or 854 and/or the conduction protrusions 812.

Referring to FIGS. 9-13, in some embodiments, a hearing aid device 100a includes a battery door module (BDM) 200a attached to a shell portion 104. In view of the substantial similarity in structure and function of the components associated with the hearing aid device 100 with respect to the hearing aid device 100a, like reference numerals are used hereinafter and in the drawings to identify like components while like reference numerals containing letter extensions are used to identify those components that have been modified.

Figure 9:
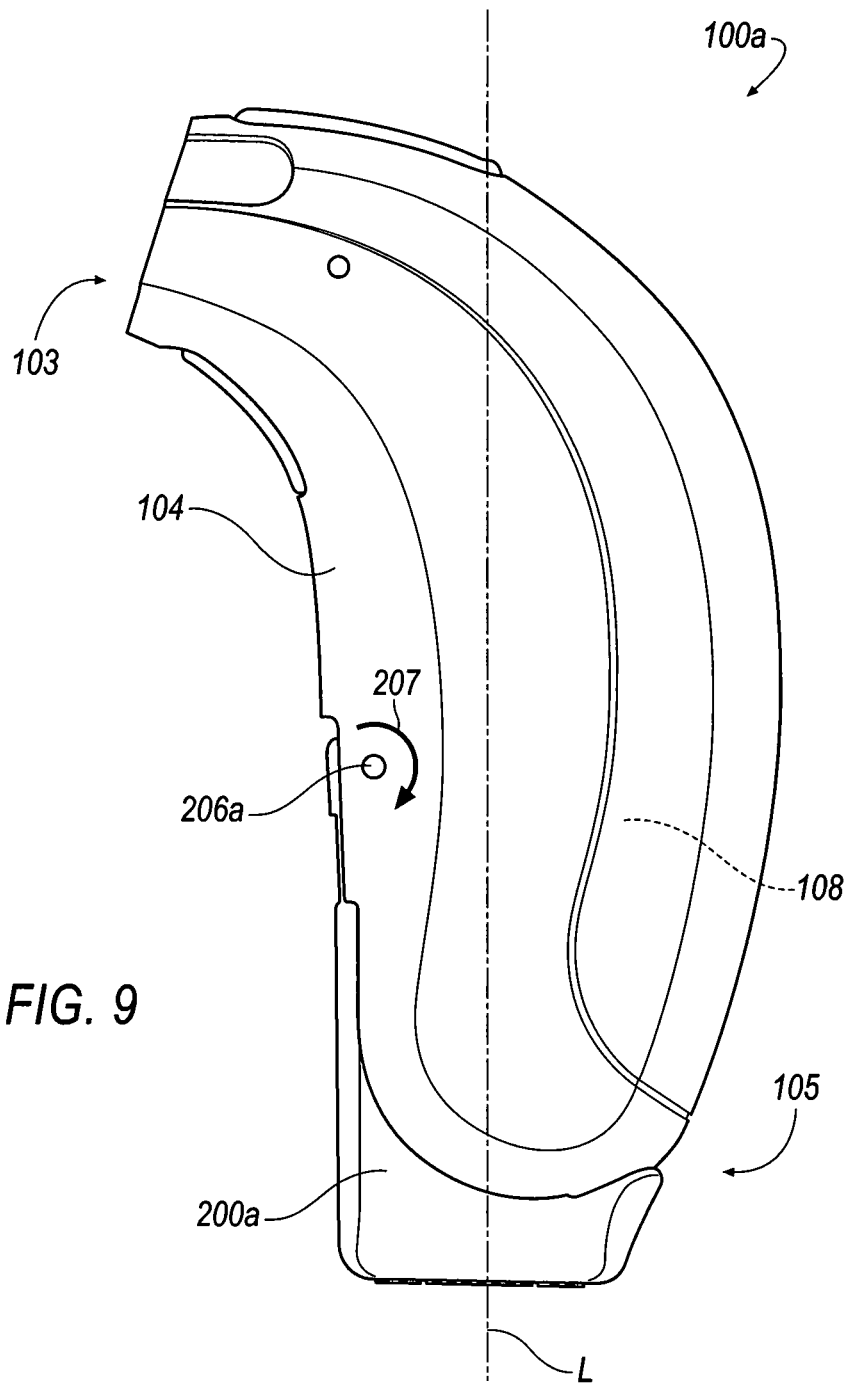
FIG. 9 is a perspective view of a battery-powered hearing aid device including a shell portion and a BDM, according to one embodiment of the present invention.

The BDM 200a may be configured to accept either one of the reduced voltage battery (e.g., zinc air battery) and the increased voltage battery and may provide recharging capabilities of the battery 202 without having to remove the BDM 200a from the shell portion 104 and/or remove the battery 202 from the BDM 200a. In some embodiments, the BDM 200a attaches to the second end 105 of the shell portion 104. Thus, the shell portion 104 corresponds to the hearing aid device 100a and the BDM 200a is configured to attach to the hearing aid device 100a. The BDM may be movable relative to the shell portion 104 between the open position for inserting the battery 202 into the BDM or removing the battery 202 from the BDM. FIG. 9 shows the BDM in the closed position relative to the shell portion 104. In some embodiments, the BDM may rotate (e.g., clockwise) about the hinge pivot axis 207 to move the BDM from the closed position to the open position.

Figure 10:
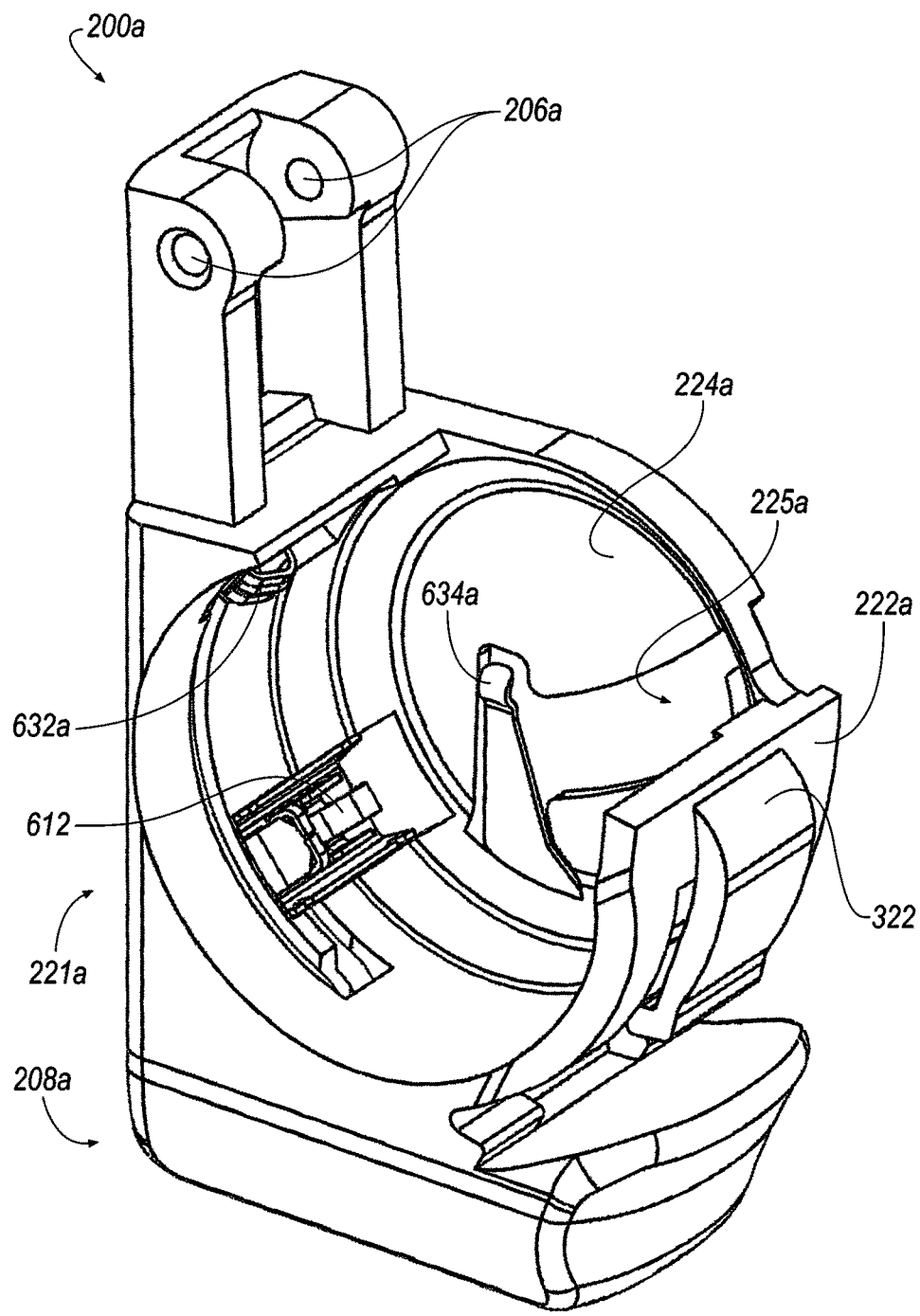
FIG. 10 is a perspective view of the BDM of FIG. 9.
Figure 11:
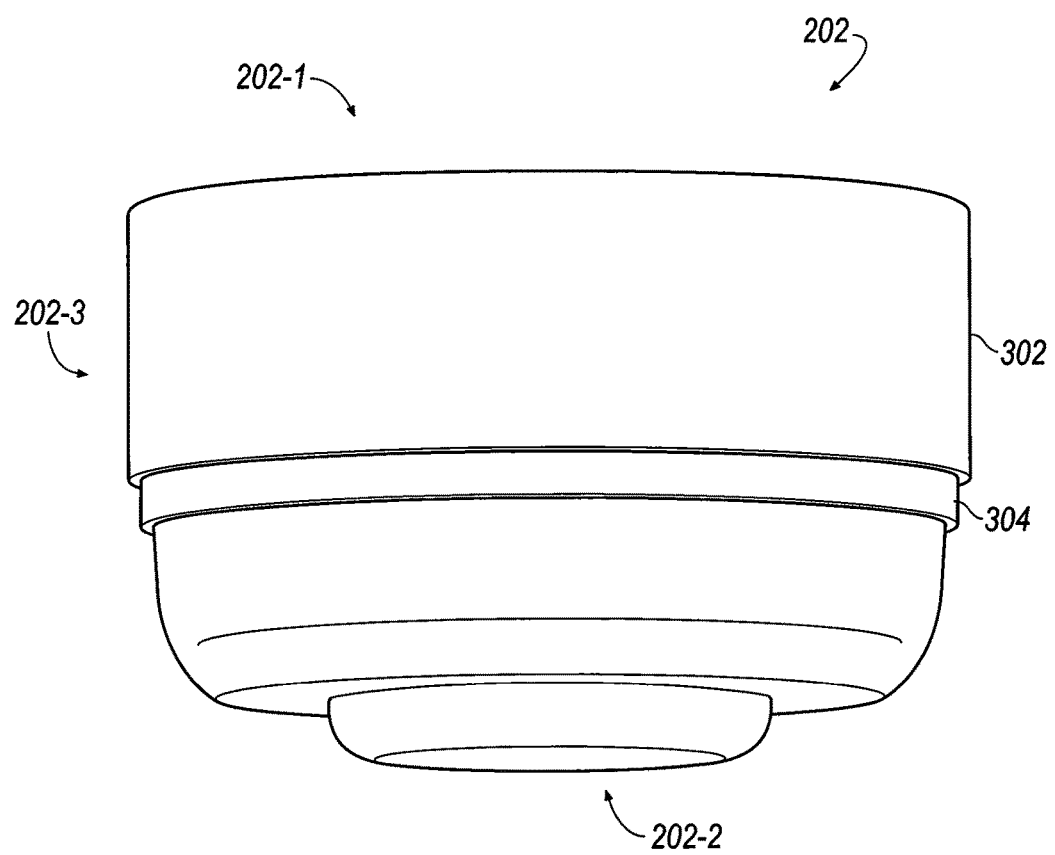
FIG. 11 is a perspective view of a battery partially enclosed by an insulator cap and an insulator.
Figure 12:
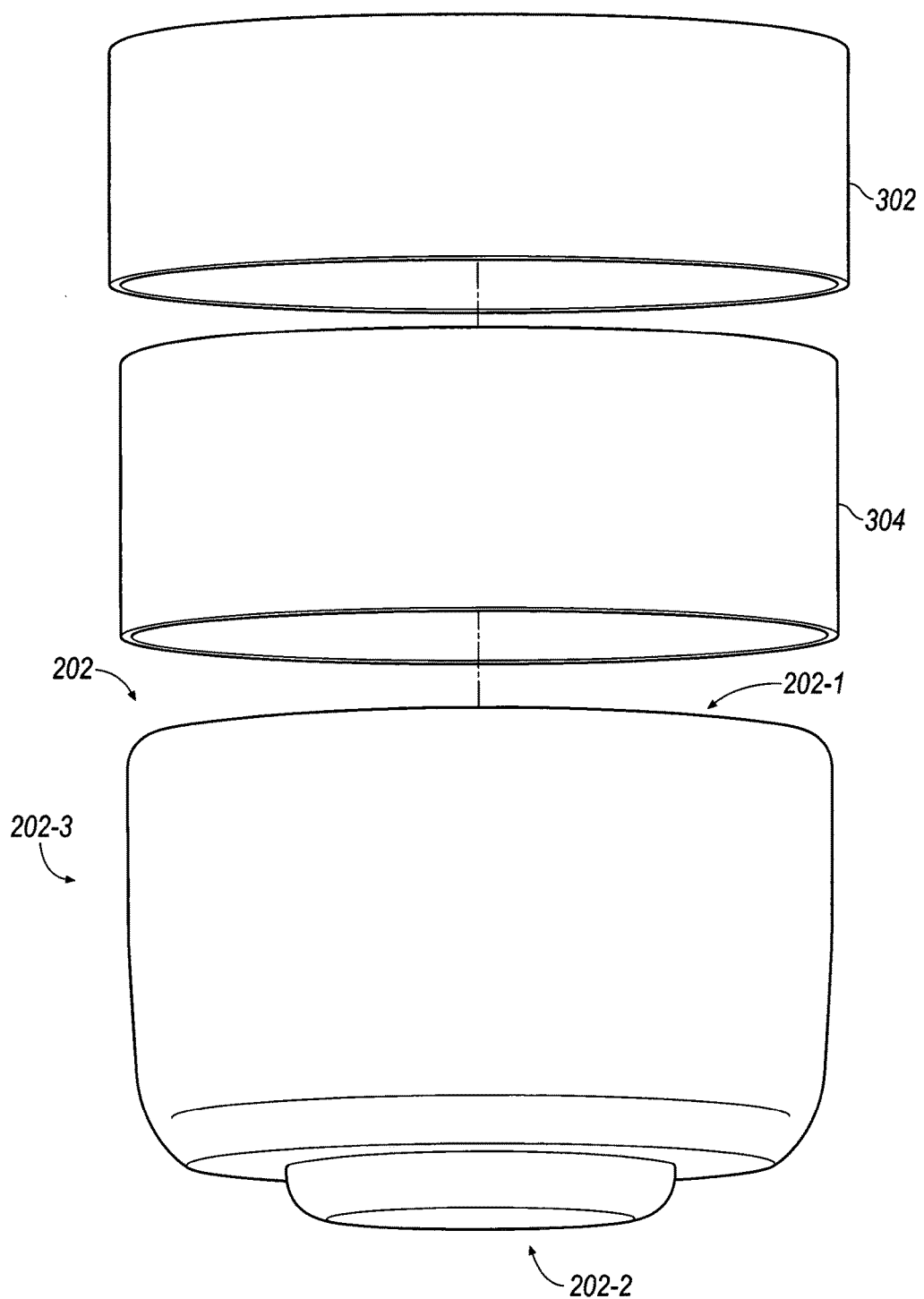
FIG. 12 is an exploded view of the battery, the insulator cap, and the insulator of FIG. 9.

Referring to FIGS. 10-14, in some embodiments, the BDM 200a includes an electronics casing 208a and a battery casing 221a. The battery casing 221a may receive and secure the battery 202 within the BDM. FIG. 10 shows the battery 202 omitted from the battery casing 221a. FIGS. 11 and 12 show an insulator cap 302 enclosing the first side 202-1 and a portion 202-3 of the battery 202. The conduction terminal 632a may contact the insulator cap 302 at a location associated with the portion of the side wall 202-3 enclosed by the insulator cap 302 to prevent the regulated output voltage $V_{OUT}$ provided to the $BAT_{OUT}$ of the battery 202 from contacting the BAT+ of the battery 202 at a remaining portion of the side wall 202-3. An insulator 304, such as an epoxy, may be coated upon the battery 202 to hold the insulator cap 302 to the first side 202-1 and the portion of the side wall 202-3 of the battery 202. The insulator 304 may also provide a degree of insulation to isolate the voltages associated with the terminals BAT+, BAT− and $BAT_{OUT}$ from one another. In some examples, the insulator 304 is bright color configured to make the battery 202 easily recognizable. In other examples, the insulator 304 is formed from Mylar® and wraps around portions of the battery 202.

Figure 13:
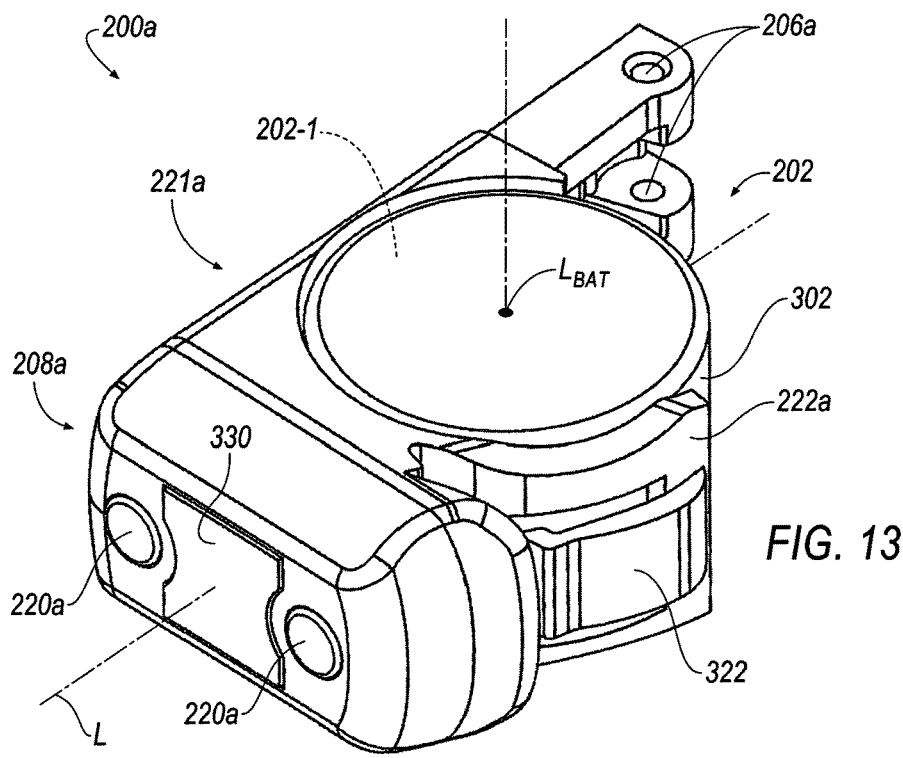
FIGS. 13-14 are perspective views of the BDM of FIG. 9 receiving the battery of FIG. 10.
Figure 14:
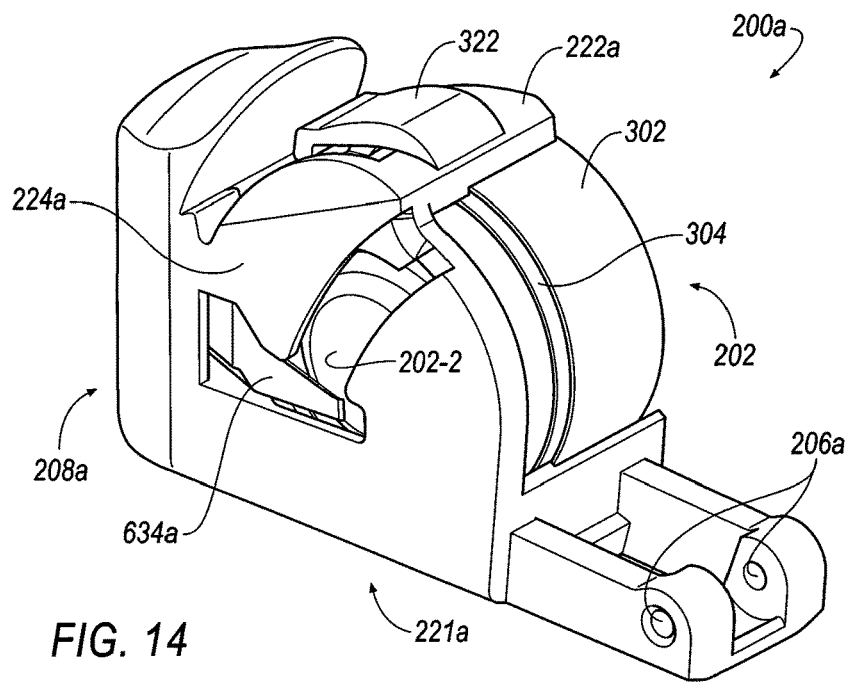

FIGS. 13 and 14 show the battery 202 received by the battery casing 221a. The battery casing 221a may be disposed between the second end 105 of the shell portion 104 and the electronics casing 208a. In some examples, the electronics casing 208a is integral to the battery casing 221a. In other examples, the electronics casing 208a and the battery casing 221a are separate components that connect to one another to form the BDM 200a. As shown in FIG. 13, the battery casing 221a is configured to receive the battery 202 with the battery axis $L_{BAT}$ extending substantially perpendicular to the longitudinal axis L of the BDM.

The BDM 200a may include an attachment member 206a disposed on the battery casing 221a that allows the BDM 200a to attach to the shell portion 104. The attachment member 206a may be rotatably supported by the shell portion 104 to permit the BDM to move relative to the shell portion 104 between the open position and the closed position. For instance, a pin may rotatably support the attachment member 206a about the hinge pivot axis 207.

In some embodiments, the battery casing 221a includes a battery cover portion 222a and a retention portion 224a. The cover portion 222a may include a curved profile conforming to the outer periphery of the battery 202 and enclosing a portion of the side wall 202-3 when the battery casing 221a receives the battery 202. In some embodiments, the cover portion 222a includes a retention tab 322 operative as a live hinge to flex and pivot into a biased state from contact with a portion of the side-wall 202-3 of the battery 202 when the battery 202 is enclosed therein. Conversely, the retention tab 322 may be unbiased in a relaxed state when the battery 202 is removed in a direction away from the retention portion 224a.

As shown in FIG. 14, the retention portion 224a may be substantially disc-shaped and disposed substantially co-axial with the battery axis $L_{BAT}$ and opposing the second side 202-2 when the battery casing 221a receives the battery 202. In some examples, the retention portion 224a includes a diameter equal to at least the diameter of the second side 202-2. An aperture 225a may be formed through a portion of the retention portion 224a to expose an inner surface of the second side 202-2 of the battery 202, as shown in FIG. 14. Conversely, FIG. 11 shows the first side 202-1 of the battery 202 entirely exposed to permit the battery 202 to be freely inserted into- or removed from—the BDM 200a.

In some embodiments, the electronics casing 208a enclose at least a portion of one or more contact elements 220a. FIG. 10 shows two contact elements 220a including charging pads exposed from a bottom surface of the electronics casing 208. The charging pads 220a are depicted as circles but may include any shape such as oval, rectangular or other polygonal shape. In some examples, the two contact elements 220a are substantially flush with the bottom surface of the electronics casing 208a. However, in other examples, the contact elements 220a may be recessed within the electronics casing 208a are protrude from the bottom surface of the electronics casing 208a. In some embodiments, the two contact elements 220a include charging pins. Similar to the contact elements 220 for the hearing aid device 100 of FIGS. 1-7, the contact elements 220a may mate with corresponding charging elements of the external charger 900 (FIG. 17) to facilitate charging of the battery 202 within the BDM 200a. FIG. 10 also shows an attraction plate 330 disposed between the contact elements 220a upon the bottom surface of the electronics casing 208a. The attraction plate 330 may include a magnet or ferromagnetic material that attracts to a magnetic element associated with the external charger to assist in orienting the hearing aid device 100a such that the contact elements 220a align with a correct polarity and make contact with the corresponding charging elements of the external charger 900.

Figure 15:
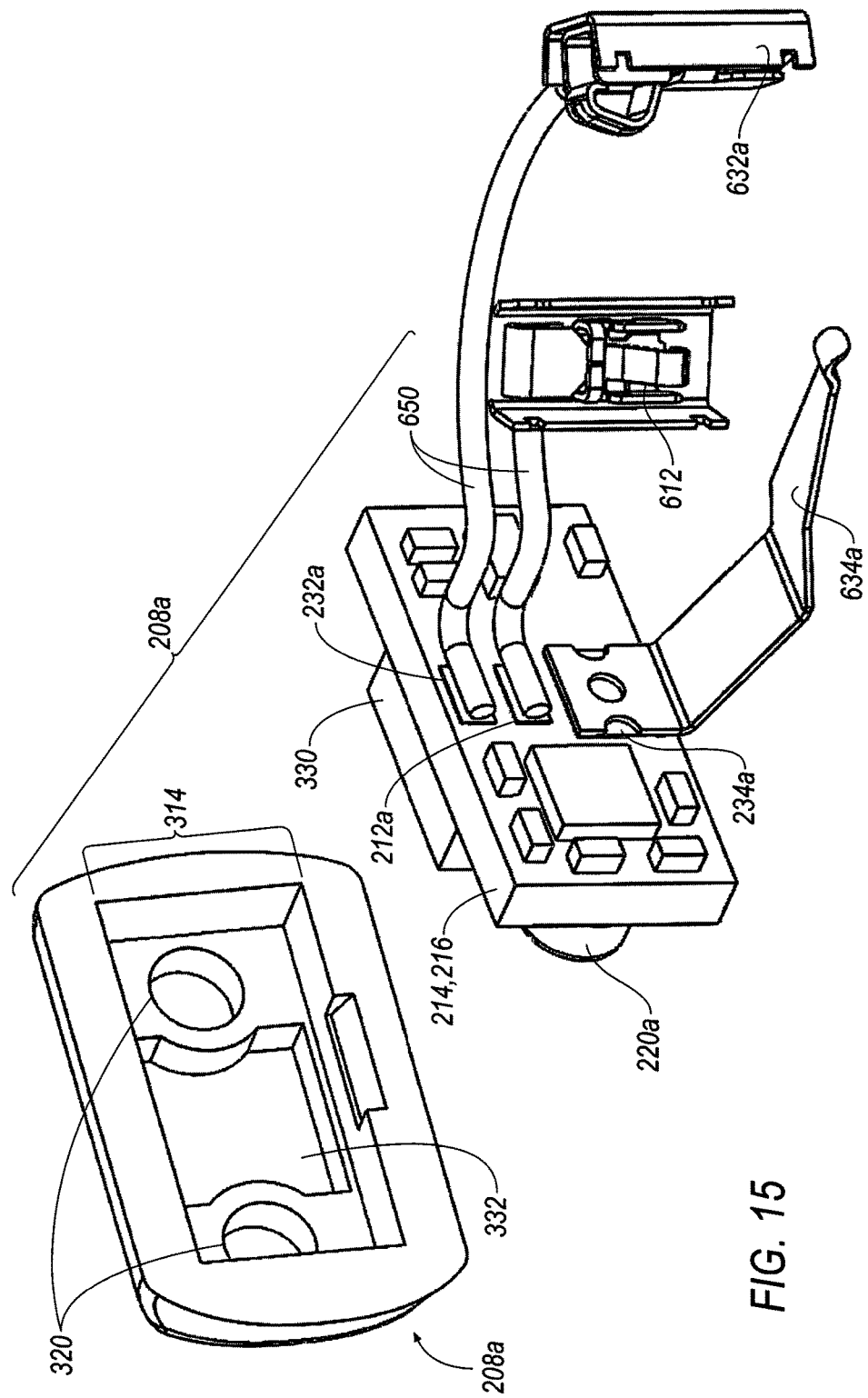
FIG. 15 is an exploded view of an electronics casing of the BDM of FIG. 9.

In some embodiments, the electronics casing 208a encloses power management components including one or more of the voltage regulator 216, the PCBA 214 and at least a portion of the charging elements 220a. The electronics casing 208a may also enclose the reed switch 218 of the hearing aid device 100 shown in FIG. 2A. Referring to FIG. 15, an exploded view of the electronics casing 208a shows the electronics casing 208a defining a cavity 314 configured to receive the PCBA 214 and the voltage regulator 216. The contact elements 220a and the attraction plate 330 may be disposed upon a bottom surface of the PCBA 214. The contact elements 220a may be electrically connected to the PCBA 214 to provide charging current to the PCBA 214 for charging the battery 202. Charging apertures 320 may be formed through the electronics casing 208 to receive corresponding ones of the contact elements 220a and an attraction aperture 332 may be formed through the electronics casing 208 for receiving the attraction plate 330.

With continued reference to FIG. 15, a plurality of contact elements 212a, 234a, 232a may be disposed upon the PCBA to electrically connect the PCBA 214 to corresponding ones of the BAT+, the BAT−, and the $BAT_{OUT}$ of the battery 202. For example, contact element 212a may conduct voltage from the BAT+ at the side wall 202-3 of the battery 202, contact element 232a may provide the regulated output voltage ($V_{OUT}$) from the voltage regulator 216 to the $BAT_{OUT}$ at the first side 202-1 and/or sidewall 202-3 of the battery 202 when the battery 202 is an increased voltage battery, and contact element 234a may conduct voltage from the BAT− at the second side 202-2 of the battery 202. In these examples, the insulation cap 302 encloses a portion of the sidewall 202-3 of the battery 202 to electrically insulate the sidewall 202-3 from the contact element 232a.

Figure 16:
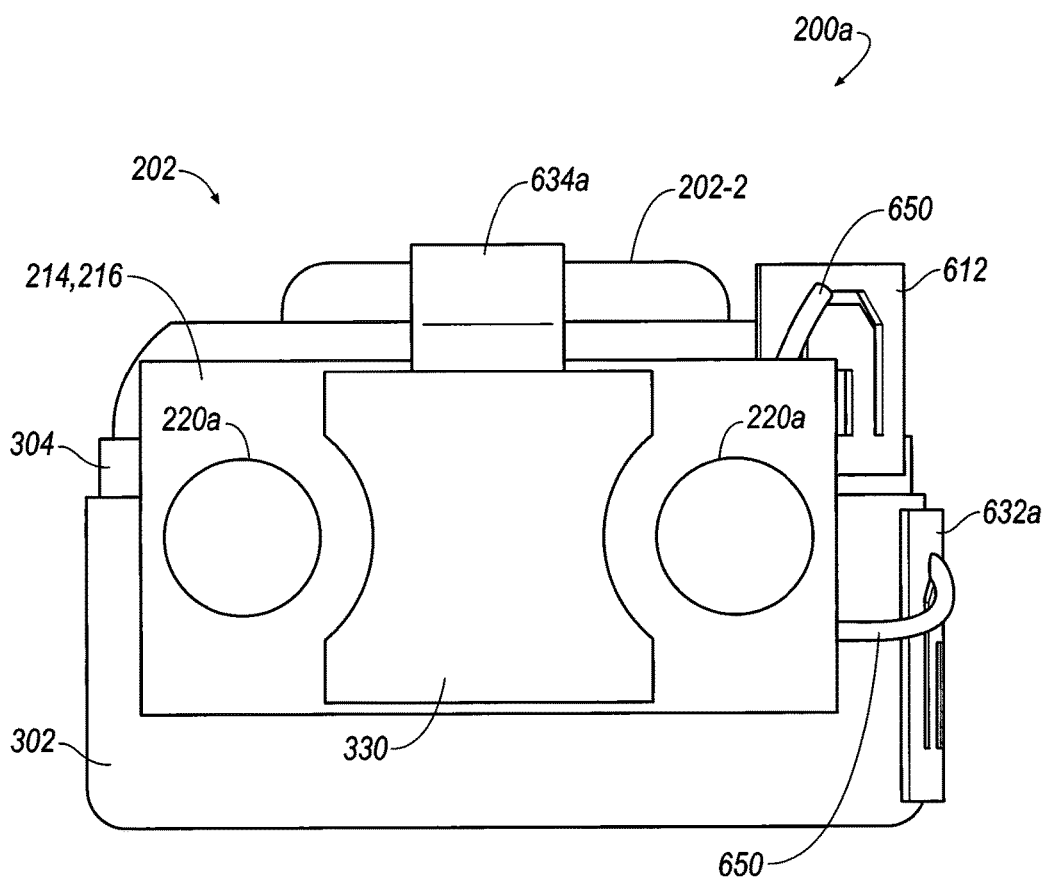
FIG. 16 is a perspective view of the BDM of FIG. 9.

Referring to FIGS. 15 and 16, in some embodiments, the contact element 232a electrically connects to a conduction terminal 632a and the contact element 212a electrically connects to a conduction terminal 612. Wires 650 may provide the electrical connection between the contact elements 212a, 232a and the corresponding conduction terminals 612, 632a. FIG. 16 shows the BDM 200a with the battery casing 221a and the electronics casing 208a omitted from the view to show the conduction terminals 612, 632a relative to the battery 202 partially enclosed by the insulator cap 302 and the insulator 304. The conduction terminal 632a may contact a portion of the side wall 202-3 adjacent to the first side 202-1 to provide the regulated output voltage ($V_{OUT}$) from the voltage regulator 216 via the contact element 232a to the $BAT_{OUT}$ of the battery 202. When doing so, the insulator cap 302 encloses this portion of the side wall 202-3 adjacent to the first side 202-1 to electrically insulate the side wall 202-3 from the conduction terminal 632a. On the other hand, the conduction terminal 612 may contact a remaining portion of the side wall 202-3 adjacent to the second side 202-2 of the battery 202 to conduct the voltage from the BAT+ of the battery 202. FIG. 10 shows the battery casing 221a receiving the conduction terminals 632a, 612. The conduction terminals 612, 632a may be biased by springs to flex when the battery 202 is received by the battery casing 221a. The battery casing 221a may include slots for receiving the conduction terminals 612, 632a and channels for guiding the wires 650 between the corresponding contact elements 212a, 232a, and the conduction terminals 612, 632a. The contact element 234a may be electrically connected to a conduction terminal 634a configured to contact the second side 202-2 of the battery 202 (FIG. 16) to conduct the voltage from the BAT− of the battery 202. The conduction terminal 634a may include a spring contact that touches the second side 202-2 of the battery 202. The aperture 225a formed through the retention portion may expose the second side 202-2 of the battery 202 upon a route the conduction terminal 634a takes to the contact element 234a.

Figure 17:
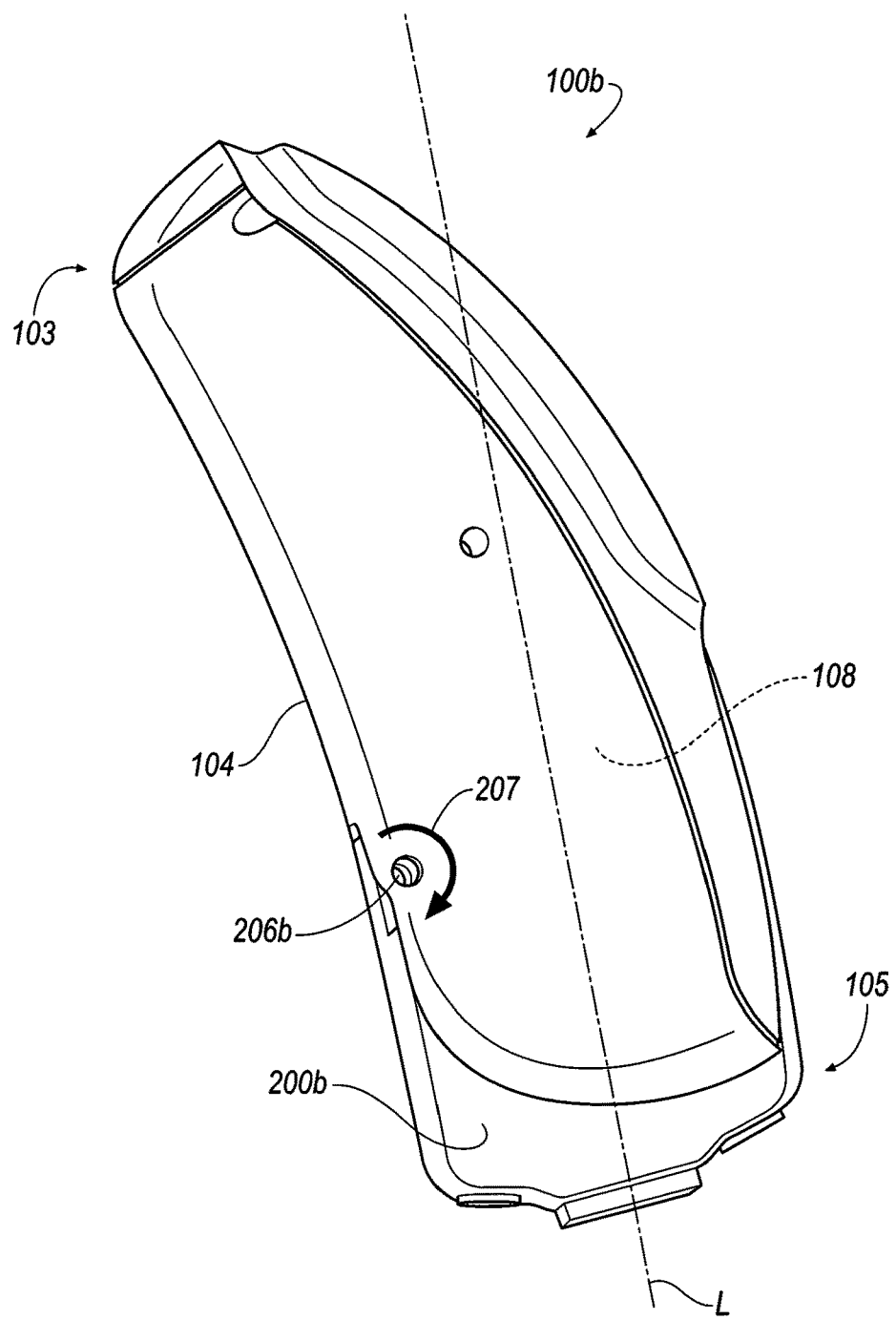
FIG. 17 is a perspective view of a battery-powered hearing aid device including a shell portion and a BDM, according to one embodiment of the present invention.
Figure 18:
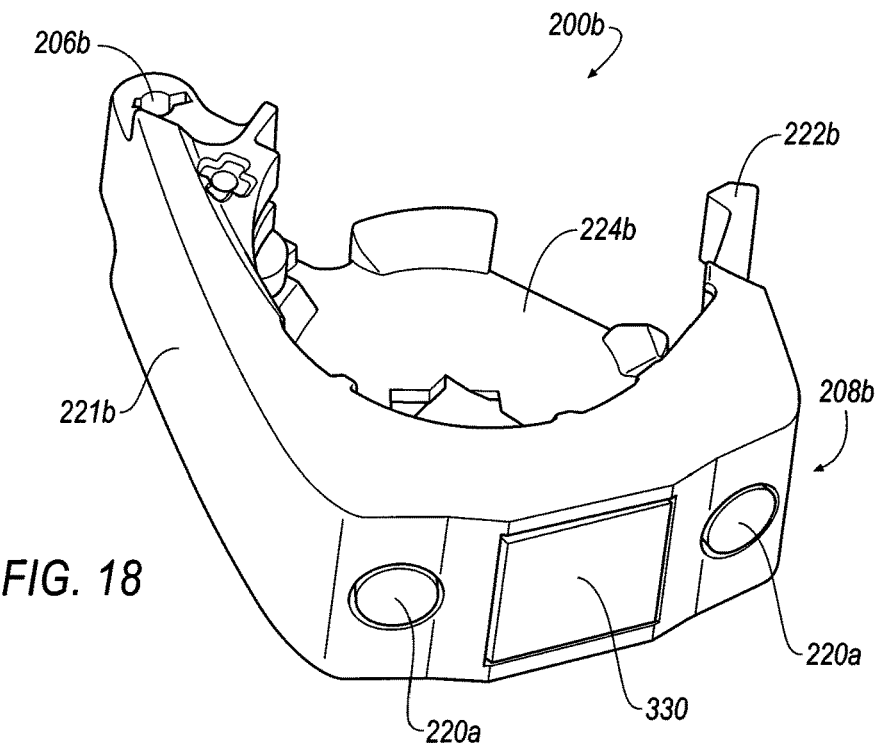
FIGS. 18 and 19 are perspective views of the BDM of FIG. 17.
Figure 19:
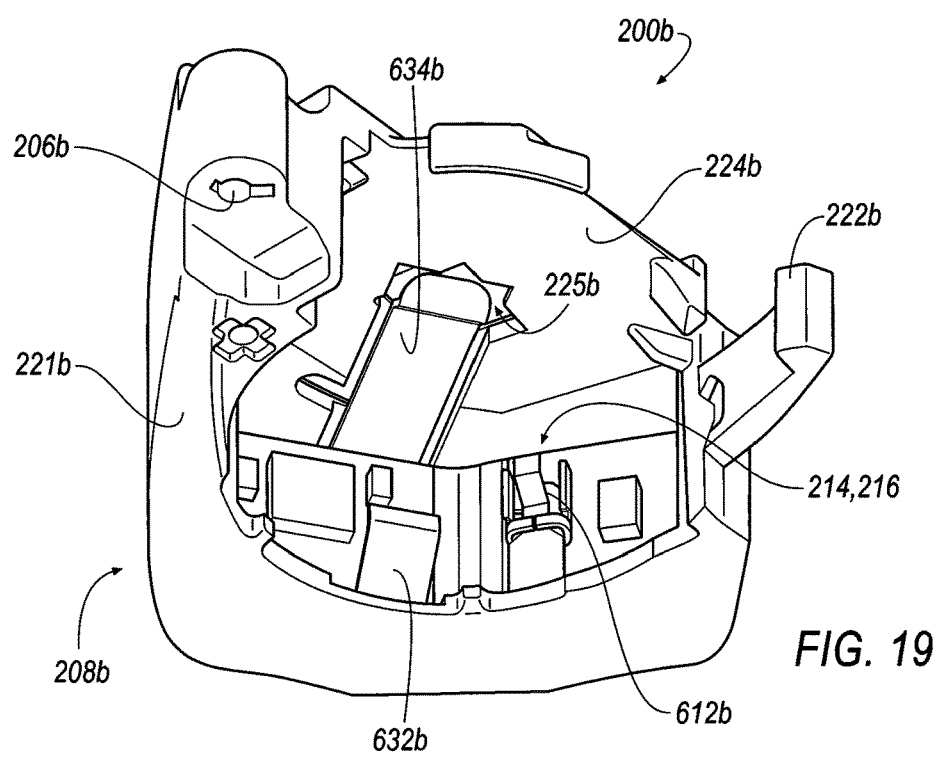
Figure 20:
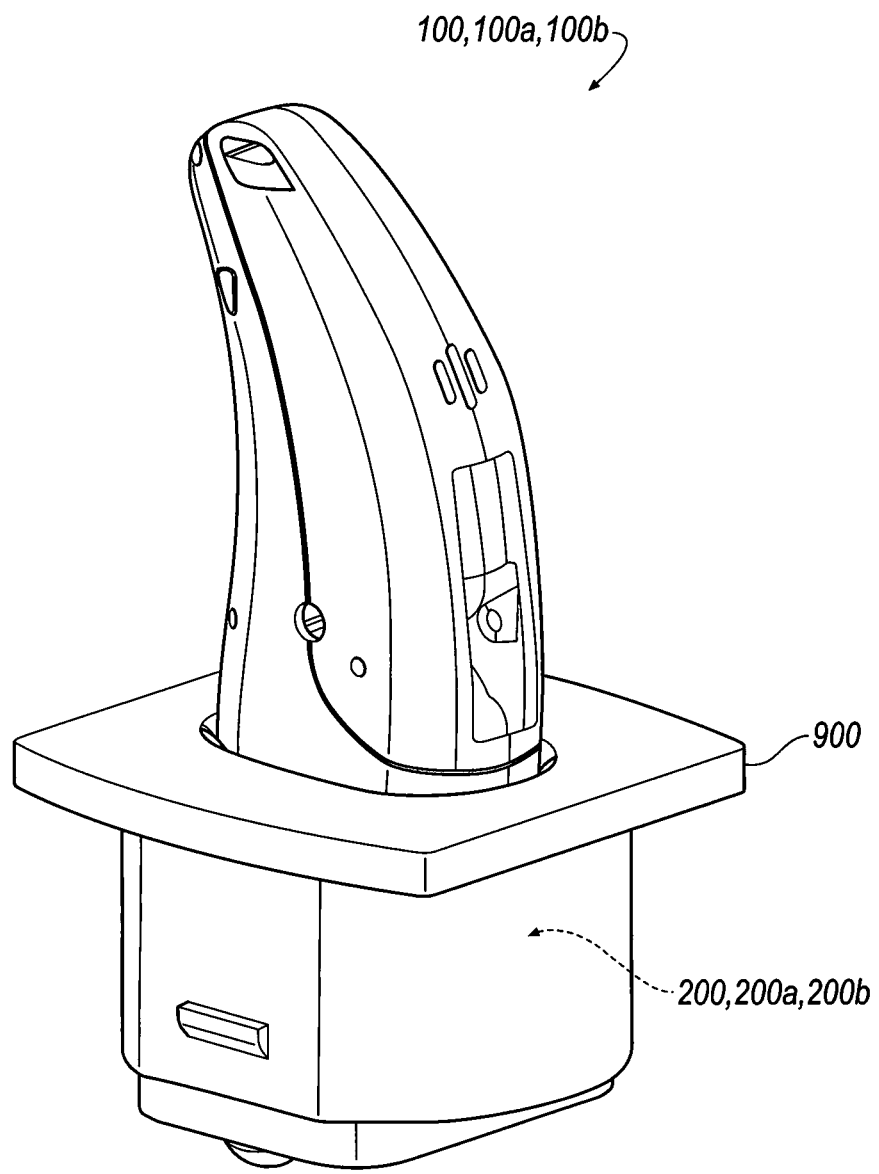
FIG. 20 shows a perspective view of an external charger receiving a hearing aid device to facilitate charging of a rechargeable battery, according to one embodiment of the present invention.

Referring to FIGS. 17-19, in some embodiments, a hearing aid device 100b includes a battery door module (BDM) 200b attached to a shell portion 104. In view of the substantial similarity in structure and function of the components associated with the hearing aid device 100 with respect to the hearing aid device 100b, like reference numerals are used hereinafter and in the drawings to identify like components while like reference numerals containing letter extensions are used to identify those components that have been modified.

The BDM 200b may be configured to accept either one of the reduced voltage battery (e.g., zinc air battery) and the increased voltage battery and may provide recharging capabilities of the battery 202 without having to remove the BDM 200b from the shell portion 104 and/or remove the battery 202 from the BDM 200b. In some embodiments, the BDM 200b attaches to the second end of the shell portion 104. Thus, the shell portion 104 corresponds to the hearing aid device 100b and the BDM 200b is configured to attach to the hearing aid device 100b. The BDM may be movable relative to the shell portion 104 between the open position for inserting the battery 202 into the BDM or removing the battery 202 from the BDM. FIG. 17 shows the BDM in the closed position relative to the shell portion 104. In some embodiments, the BDM may rotate (e.g., clockwise) about the hinge pivot axis 207 to move the BDM from the closed position to the open position.

Referring to FIGS. 18 and 19, in some embodiments, the BDM 200b includes an electronics casing 208b and a battery casing 221b. While the battery 202 is omitted from FIGS. 18 and 19, the battery casing 221b may receive and secure the battery 202 within the BDM. The battery casing 221b may be disposed between the second end 105 of the shell portion 104 and the electronics casing 208b. In some examples, the electronics casing 208b is integral to the battery casing 221b. In other examples, the electronics casing 208b and the battery casing 221b are separate components that connect to one another to form the BDM 200b. The battery casing 221b may be configured to receive the battery 202 with battery axis $L_{BAT}$ extending substantially perpendicular to the longitudinal axis L of the BDM.

The BDM 200b may include an attachment member 206b disposed on the battery casing 221b that allows the BDM 200b to attach to the shell portion 104. Similar to the attachment members 206, 206a of the BDMs 200, 200b described above, the attachment member 206b may be rotatably supported by the shell portion 104 to permit the BDM to move relative to the shell portion 104 between the open position and the closed position. For instance, a pin may rotatably support the attachment member 206b about the hinge pivot axis 207.

In some embodiments, the battery casing 221b includes a battery cover portion 222b and a retention portion 224b. The cover portion 222b may include a curved profile conforming to the outer periphery of the battery 202 (not shown) and enclosing a portion of the side wall 202-3 when the battery casing 221b receives the battery 202. In some embodiments, the cover portion 222b operates as a live hinge to flex and pivot into a biased state from contact with a portion of the side-wall 202-3 of the battery 202 when the battery 202 is enclosed therein. Conversely, the cover portion 222b may be unbiased in a relaxed state when the battery 202 is removed (as shown in FIGS. 18 and 19) in a direction away from the retention portion 224b.

The retention portion 224b may be substantially disc-shaped and disposed substantially co-axial with the battery axis $L_{BAT}$ and opposing the second side 202-2 when the battery casing 221b receives the battery 202 (not shown). An aperture 225b may be formed through a portion of the retention portion 224a to expose an inner surface of the second side 202-2 of the battery 202. Conversely, the first side 202-1 of the battery 202 when received by the battery casing 221b is entirely exposed to permit the battery 202 to be freely inserted into—or removed from—the BDM 200b.

FIG. 18 shows the electronics casing 208b enclosing at least a portion of the one or more contact elements 220a. The contact elements 220a may be substantially flush with the bottom surface of the electronics casing 208b, may be recessed within the electronics casing 208b or may protrude from the bottom surface of the electronics casing 208b. FIG. 18 also shows the attraction plate 330 disposed between the contact elements 220a upon the bottom surface of the electronics casing 208b.

In some embodiments, the electronics casing 208b encloses power management components including one or more of the voltage regulator 216, the printed circuit and at least a portion of the charging elements 220a. The electronics casing 208b may also enclose the reed switch 218 of the hearing aid device 100 shown in FIG. 2A. While the electronics casing 208a of the BDM 200a of FIGS. 9-16 includes a substantially flat bottom surface, the electronics casing 208b of the BDM 200b includes a curved bottom surface. Referring to FIG. 19, the electronics casing 208b receives the PCBA 214 and the voltage regulator 216. The contact elements 220a may be electrically connected to the PCBA 214 to provide charging current to the PCBA 214 for charging the battery 202.

With continued reference to FIG. 19, a plurality of conduction terminals 612b, 634b, 632b may be disposed upon the PCBA to electrically connect the PCBA 214 and corresponding ones of the BAT+, the BAT−, and the $BAT_{OUT}$ of the battery 202. For example, conduction terminal 612b may conduct voltage from the BAT+ at the side wall 202-3 of the battery 202, conduction terminal 632b may provide the regulated output voltage ($V_{OUT}$) from the voltage regulator 216 to the $BAT_{OUT}$ at the first side 202-1 and/or sidewall 202-3 of the battery 202 when the battery 202 is an increased voltage battery, and conduction terminal 634b may conduct voltage from the BAT− at the second side 202-2 of the battery 202.

In some embodiments, the conduction terminal 632b contacts a portion of the side wall 202-3 adjacent to the first side 202-1 to provide the regulated output voltage ($V_{OUT}$) from the voltage regulator 216 to the $BAT_{OUT}$ of the battery 202. On the other hand, the conduction terminal 612b may contact a remaining portion of the side wall 202-3 adjacent to the second side 202-2 of the battery 202 to conduct the voltage from the BAT+ of the battery 202. In these examples, the insulator cap 302 of FIGS. 11 and 12 may enclose the portion of the side wall 202-3 and mate with the conduction terminal 632b to prevent the regulated output voltage $V_{OUT}$ provided to the $BAT_{OUT}$ of the battery 202 from contacting the BAT+ of the battery 202 at the remaining portion of the side wall 202-3 uncovered by the insulator cap 302. The insulator 304 (FIGS. 11 and 12) may include an epoxy coated upon the battery 202 to hold the insulator cap 302 to the first side 202-1 and the portion of the side wall 202-3 of the battery 202. The conduction terminal 634b may include a spring contact that touches the negative terminal (BAT−) of the battery 202 at the second side 202-2. The aperture 225b formed through the retention portion may expose the second side 202-2 of the battery 202 upon a route the conduction terminal 634b takes to the contact element 234a.

FIG. 19 shows a perspective view of the external charger 900 receiving the hearing aid device 100, 100a, 100b to facilitate charging of the battery 202. The charger 900 may receive the hearing aid device 100, 100a, 100b such that the contact elements 220, 220a associated with the BDM 200, 200a, 200b align with a correct polarity and make contact with the corresponding charging elements of the external charger 900. Thus, the charger 900 may provide recharging capabilities of the battery 202 without having to remove the BDM 200, 200a 200b from the shell portion 104 and/or remove the battery 202 from the BDM 200, 200a, 200b. The contact elements 220, 220a may include contact pads or charging pins. In some examples, the contact elements 220, 220a protrude from the BDM 200, 200a, 200b and align with corresponding contact pads associated with the charger 900. In these examples, the contact elements 220, 220a may be biased (e.g., spring biased) to protrude from the BDM and retract upon contact with the contact pads of the charger. In other examples, the contact elements 220, 220a are substantially flush with the bottom surface of the BDM 200, 200a, 200b. Alternatively, the contact elements 200, 200a may be recessed within the BDM and the external charger may include pins that extend into the BDM to mate with the recessed contact elements. As described in the foregoing, in some embodiments, the external charger 900 may wirelessly charge the battery 202.

A number of embodiments have been described. Nevertheless, it will be understood that various modifications may be made without departing from the spirit and scope of the disclosure. Accordingly, other embodiments are within the scope of the following claims.

What is claimed is:

1. A battery door module of a hearing aid device, comprising:
    a battery casing configured to receive an annular battery defining a battery axis that extends substantially perpendicular to a longitudinal axis of the battery door module when the battery casing receives the battery, the battery comprising:
        a first side corresponding to an output terminal of the battery;
        a second side disposed on an opposite side of the battery than the first side and at least partially enclosed by the battery casing, the second side corresponding to a negative terminal of the battery; and
        a circumferential side wall defining an outer periphery of the battery that extends between the first side and the second side, the side wall corresponding to a positive terminal of the battery;
    an electronics casing enclosing a voltage regulator, a printed circuit board assembly, and at least a portion of one or more charging elements; and
at least one attachment member disposed on at least one of the battery casing or the electronics casing and allowing the battery door module to attach to a shell portion of the hearing aid device, the battery door module movable relative to the shell portion between an open position and a closed position;
    wherein the battery door module is configured with electrical connections capable of bypassing the voltage regulator.

2. The battery door module of claim 1, wherein the at least one attachment member comprises a first attachment member that connects to the shell portion of the hearing aid device when the battery door module is in the closed position.

3. The battery door module of claim 1, wherein the at least one attachment member comprises a second attachment member rotatably supported by the shell portion of the hearing aid device and permitting the moving of the battery door module relative to the shell portion between the open position and the closed position.

4. The battery door module of claim 1, wherein the shell portion the hearing aid device encloses electrical components comprising at least one of a microphone, a signal processor, an audio amplifier, electrical circuitry, or a loud speaker.

5. The battery door module of claim 1, wherein the printed circuit board assembly and the charging elements reside outside the shell portion when the battery door module is in the closed position.

6. The battery door module of claim 1, wherein the battery casing comprises:
    a battery cover portion having a curved profile conforming to the outer periphery of the battery and enclosing a portion of the side wall when the battery casing receives the battery; and
    a retention portion substantially co-axial with the battery axis and opposing the second side when the battery casing receives the battery, the retention portion including an outer diameter equal to at least a diameter of the second side and an inner diameter defining an aperture that exposes an inner surface of the second side of the battery.

7. The battery door module of claim 1, wherein the battery comprises either one of a reduced voltage battery and an increased voltage battery.

8. The battery door module of claim 1, wherein the printed circuit board assembly comprises a plurality of contact elements, each contact element configured to conduct voltage between the printed circuit board assembly and a corresponding one of the negative and positive terminals of the battery and the output terminal of the battery associated with a regulated output voltage from the printed circuit board assembly.

9. The battery door module of claim 8, wherein the printed circuit board assembly and the voltage regulator are unpowered by the battery when at least one of the contact elements is electrically disconnected from the battery.

10. The battery door module of claim 8, wherein voltage conducted from the battery bypasses the voltage regulator when all of the contact elements are electrically connected to the battery and the positive terminal of the battery is electrically connected to the output terminal of the battery.

11. The battery door module of claim 8, wherein at least one of the plurality of contact elements is gold-plated.

12. The battery door module of claim 1, wherein the electronics casing defines a key feature, the key feature receiving a key-insulator configured to isolate voltages associated with the negative terminal, the positive terminal, and the output terminal of the battery from one another.

13. The battery door module of claim 12, wherein the key-insulator comprises:
    a first insulation channel configured to receive a first conduction strip, the first conduction strip conducting voltage between the negative terminal of the battery and the printed circuit board assembly; and
    a second insulation channel extending substantially parallel to the first insulation channel and configured to receive a second conduction strip, the second conduction strip providing a regulated output voltage from the printed circuit board assembly to the output terminal of the battery.

14. The battery door module of claim 13, wherein the first and second conduction strips are formed from one or more materials including nickel, nickel alloy or gold.

15. The battery door module of claim 1, further comprising an insulator cap enclosing the first side of the battery and a portion of the side wall of the battery, the insulator cap configured to contact a conduction terminal at a location associated with the portion of the side wall enclosed by the insulator cap to prevent a regulated output voltage from the printed circuit board assembly to the output terminal of the battery from contacting the positive terminal of the battery at a remaining portion of the side wall not enclosed by the insulator cap.

16. The battery door module of claim 1, wherein each of the one or more charging elements include a tip portion exposed from the battery door module that permits charging of the battery by an external charger without having to remove the battery door module from shell portion.

17. The battery door module of claim 1, wherein the electronics casing entirely encloses the charging elements.

18. The battery door module of claim 17, wherein the charging elements are configured to electrically connect to charging contacts of an external charger that extend into the electronics casing to charge the battery.

19. The battery door module of claim 1, wherein the charging elements are configured to wirelessly connect to an external charger to charge the battery.

20. The battery door module of claim 1, wherein the one or more charging elements provide a charging voltage to the printed circuit board assembly to charge the battery during a charging event.

21. The battery door module of claim 1, further comprising a first conduction disc substantially co-axial with the battery axis and electrically connected to the first side of the battery when the battery casing receives the battery, the first conduction disc providing a regulated output voltage from the printed circuit board assembly to the output terminal of the battery at the first side.

22. The battery door module of claim 21, further comprising an insulating disc disposed between the first conduction disc and the battery at the first side to prevent the regulated output voltage provided to the output terminal of the battery from contacting the positive terminal of the battery at the side wall.

23. The battery door module of claim 1, wherein the voltage regulator determines whether the battery is an increased voltage battery or a reduced voltage battery based upon a magnitude of input voltage supplied from the battery.

24. The battery door module of claim 23, wherein the voltage regulator reduces the magnitude of the input voltage supplied from the battery when the battery is an increased voltage battery to ensure that a resulting output voltage for powering the hearing aid device does not exceed a maximum output voltage.

25. The battery door module of claim 1, further comprising a reed switch or switch device that blocks the charging elements from an output voltage of the battery that powers the hearing aid device.

26. A method for assembling a hearing aid device, the method comprising:
providing the battery door module of claim 1; and
attaching the battery door module to a shell portion of the hearing aid device enclosing electrical components.

27. The method of claim 26, wherein attaching the battery door module to the shell portion comprises connecting at least one attachment member disposed on at least one of the battery casing or the electronics casing to the shell portion.

28. A battery door module of a hearing aid device, comprising:
a battery casing configured to receive an annular battery defining a battery axis that extends substantially perpendicular to a longitudinal axis of the battery door module when the battery casing receives the battery, the battery comprising:
a first side corresponding to an output terminal of the battery;
a second side disposed on an opposite side of the battery than the first side and at least partially enclosed by the battery casing, the second side corresponding to a negative terminal of the battery; and
a circumferential side wall defining an outer periphery of the battery that extends between the first side and the second side, the side wall corresponding to a positive terminal of the battery;
an electronics casing enclosing a voltage regulator, a printed circuit board assembly, and at least a portion of one or more charging elements; and
at least one attachment member disposed on at least one of the battery casing or the electronics casing and allowing the battery door module to attach to a shell portion of the hearing aid device, the battery door module movable relative to the shell portion between an open position and a closed position;
wherein the electronics casing defines a key feature, the key feature receiving a key-insulator configured to isolate voltages associated with the negative terminal, the positive terminal, and the output terminal of the battery from one another; and
wherein the key-insulator comprises:
a first insulation channel configured to receive a first conduction strip, the first conduction strip conducting voltage between the negative terminal of the battery and the printed circuit board assembly; and
a second insulation channel extending substantially parallel to the first insulation channel and configured to receive a second conduction strip, the second conduction strip providing a regulated output voltage from the printed circuit board assembly to the output terminal of the battery.

29. The battery door module of claim 28, wherein the first and second conduction strips are formed from one or more materials including nickel, nickel alloy or gold.

30. A battery door module of a hearing aid device, comprising:
a battery casing configured to receive an annular battery defining a battery axis that extends substantially perpendicular to a longitudinal axis of the battery door module when the battery casing receives the battery, the battery comprising:
a first side corresponding to an output terminal of the battery;
a second side disposed on an opposite side of the battery than the first side and at least partially enclosed by the battery casing, the second side corresponding to a negative terminal of the battery; and
a circumferential side wall defining an outer periphery of the battery that extends between the first side and the second side, the side wall corresponding to a positive terminal of the battery;
an electronics casing enclosing a voltage regulator, a printed circuit board assembly, and at least a portion of one or more charging elements; and at least one attachment member disposed on at least one of the battery casing or the electronics casing and allowing the battery door module to attach to a shell portion of the hearing aid device, the battery door module movable relative to the shell portion between an open position and a closed position; and the battery door module further comprising a first conduction disc substantially co-axial with the battery axis and electrically connected to the first side of the battery when the battery casing receives the battery, the first conduction disc providing a regulated output voltage from the printed circuit board assembly to the output terminal of the battery at the first side.

31. The battery door module of claim 30, further comprising an insulating disc disposed between the first conduction disc and the battery at the first side to prevent the regulated output voltage provided to the output terminal of the battery from contacting the positive terminal of the battery at the side wall.

* * * * *